United States Patent
Wang et al.

(10) Patent No.: US 10,841,661 B2
(45) Date of Patent: Nov. 17, 2020

(54) INTERACTIVE METHOD, APPARATUS, AND SYSTEM IN LIVE ROOM

(71) Applicant: TENCENT TECHNOLOGY (SHENZHEN) COMPANY LIMITED, Shenzhen (CN)

(72) Inventors: Shanshan Wang, Shenzhen (CN); Zhu Liang, Shenzhen (CN); Hao Zhang, Shenzhen (CN); Shi Wang, Shenzhen (CN); Guowei Tang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 60 days.

(21) Appl. No.: 16/222,210

(22) Filed: Dec. 17, 2018

(65) Prior Publication Data

US 2019/0124400 A1    Apr. 25, 2019

Related U.S. Application Data

(63) Continuation of application No. PCT/CN2017/095254, filed on Jul. 31, 2017.

(30) Foreign Application Priority Data

Aug. 31, 2016 (CN) .......................... 2016 1 0783538

(51) Int. Cl.
*H04N 21/4788* (2011.01)
*H04N 21/2187* (2011.01)
(Continued)

(52) U.S. Cl.
CPC ..... *H04N 21/4788* (2013.01); *H04N 21/2187* (2013.01); *H04N 21/4316* (2013.01);
(Continued)

(58) Field of Classification Search
CPC .......... H04N 21/4788; H04N 21/4334; H04N 21/472; H04N 21/47217; H04N 21/4333;
(Continued)

(56) References Cited

U.S. PATENT DOCUMENTS 6,418,214 B1 * 7/2002 Smythe .................. H04M 3/56
                                                            379/202.01
2007/0136758 A1    6/2007 Lehikoinen et al.
(Continued)

FOREIGN PATENT DOCUMENTS

| CN | 101127880 A | 2/2008 |
|----|-------------|--------|
| CN | 103634681 A | 3/2014 |
| CN | 105828214 A | 8/2016 |
| CN | 105898609 A | 8/2016 |
| CN | 106341695 A | 1/2017 |

OTHER PUBLICATIONS

The World Intellectual Property Organization (WIPO) International Search Report for PCT/CN2017/095254 dated Nov. 7, 2017 5 Pages (including translation).

*Primary Examiner* — Cynthia M Fogg
(74) *Attorney, Agent, or Firm* — Anova Law Group, PLLC

(57) ABSTRACT

The present disclosure discloses an interactive method and apparatus in a live room. The method includes: receiving, from a live backstage, a live video stream sent by a first client; displaying a live interface on a display screen according to the live video stream; receiving, from the live backstage, an interactive video sent by a second client, the second client and the first client belong to a same live room, and the interactive video being a video whose video duration is less than a preset threshold; and playing, in picture-in-picture mode (PIP), the interactive video on a PIP area of the live interface.

20 Claims, 16 Drawing Sheets

(51) Int. Cl.
*H04N 21/472* (2011.01)
*H04N 21/433* (2011.01)
*H04N 21/431* (2011.01)

(52) U.S. Cl.
CPC ..... *H04N 21/4333* (2013.01); *H04N 21/4334* (2013.01); *H04N 21/472* (2013.01); *H04N 21/47217* (2013.01)

(58) Field of Classification Search
CPC ........... H04N 21/4316; H04N 21/2187; H04N 21/4756; H04N 21/2365; H04N 7/181; H04N 7/15; H04N 21/23424; H04N 7/17318; H04N 21/2743; H04N 2007/145; H04L 65/403; H04L 51/10; H04L 65/4015
USPC .......................................................... 725/59
See application file for complete search history.

(56) References Cited

U.S. PATENT DOCUMENTS

| | | | |
|---|---|---|---|
| 2008/0059570 A1* | 3/2008 | Bill | G06Q 10/10 709/203 |
| 2009/0287790 A1* | 11/2009 | Upton | H04N 7/17318 709/208 |
| 2013/0103814 A1* | 4/2013 | Carrasco | H04L 65/4092 709/223 |
| 2014/0030980 A1* | 1/2014 | D'Ambrosio | H04W 76/40 455/41.3 |
| 2014/0032565 A1 | 1/2014 | Parker | |
| 2014/0096167 A1* | 4/2014 | Lang | H04N 21/4223 725/91 |
| 2015/0143443 A1* | 5/2015 | Boyle | H04N 21/437 725/110 |
| 2015/0356649 A1* | 12/2015 | Glass | G06Q 20/123 705/26.1 |
| 2019/0250784 A1* | 8/2019 | Bodamer | H04L 63/104 |

* cited by examiner

INTERACTIVE METHOD, APPARATUS, AND SYSTEM IN LIVE ROOM

RELATED APPLICATION

This application claims priority to PCT Application No. PCT/CN2017/095254, which was filed on Jul. 31, 2017 and claims priority to Chinese Patent Application No. 2016107835383, entitled "INTERACTIVE METHOD, APPARATUS, AND SYSTEM IN LIVE ROOM" filed with the Patent Office of China on Aug. 31, 2016. The two applications are incorporated by reference in their entirety.

FIELD OF THE TECHNOLOGY

Embodiments of the present disclosure relate to the field of Internet technologies, and in particular, to an interactive method, apparatus, and system in a live room.

BACKGROUND OF THE DISCLOSURE

A live broadcasting system includes a server system that broadcasts a live video stream sent by an anchor to multiple viewer clients. The live broadcasting system provides multiple life broadcasting rooms or live rooms. After entering a live room online, a viewer can watch a live video stream sent by an anchor in that live room.

In a live room, a viewer interacts with an anchor mainly in a form of posting a comment message. The viewer sends a comment message to a server, and the server multicasts the comment message to the anchor and other viewers in the same live room. The terminals of the anchor and the other viewers receive and display the comment message. The anchor and other viewers can also respond to the comment message when necessary.

While one way for the viewer to interact with the anchor is by sending a comment message in a text form, the operational complexity for the viewer to interact with the anchor through text messaging is far greater than the operational complexity for the anchor to interact with the viewer.

SUMMARY

To resolve the problem in the existing technology that the operational complexity for a viewer client to perform interaction is far larger than the operational complexity for an anchor client to perform interaction, embodiments of the present disclosure provide an interactive method, apparatus, and system in a live room. The technical solutions are as follows:

According to a first aspect of the embodiments of the present disclosure, an interactive method in a live room is provided, and is used on a first client and a second client. The method includes the steps of receiving, from a live backstage, a live video stream sent by a first client; displaying a live interface on a display screen according to the live video stream; receiving, from the live backstage, an interactive video sent by a second client. The second client and the first client belong to a same live room. The interactive video being a video whose video duration is less than a length threshold. The method further includes playing, in picture-in-picture mode (PIP), the interactive video on a PIP area of the live interface.

According to a second aspect of the embodiments of the present disclosure, an interactive method in a live room is provided. The method comprises the steps of receiving, from a live backstage, a live video stream sent by a first client; displaying a live interface according to the live video stream; and receiving a recording instruction in the process of displaying the live interface. The method further includes recording an interactive video according to the recording instruction, video duration of the interactive video being less than a length threshold; and sending the interactive video to the live backstage, the interactive video being a video that can be played in PIP mode by the first client or a second client on a PIP area of the live interface.

According to a third aspect of the embodiments of the present disclosure, an interactive method in a live room is provided. The method the steps of receiving a live video stream sent by a first client; sending the live video stream to a client in a live room. The client in the live room may be the first client or a second client. The method further includes receiving an interactive video sent by the second client; and sending the interactive video to the client in the live room. The interactive video is a video that can be played on a PIP area of a live interface.

According to a fourth aspect of the embodiments of the present disclosure, a server, including a processor and a memory, is provides. The memory is configured to store one or more program instructions. The processor is configured to run the program instructions stored in the memory, to perform the method including the steps of: receiving a live video stream sent by a first client; sending the live video stream to a client in a live room, the client in the live room comprising the first client or a second client; receiving an interactive video sent by the second client; and sending the interactive video to the client in the live room. The interactive video is a video that can be played in PIP mode on an area of a live interface.

In embodiments of the present disclosure, an interactive video of a second client is obtained from a live backstage. The interactive video is a video whose video duration is less than a length threshold, and the interactive video is played on a PIP area of a live interface. Embodiments of the present disclosure provide a method for the second client to interact with a first client in a video form. In embodiments of the present disclosure, a recording operation of the interactive video is relatively easy. The second client can implement interactions without complex user operations. Thus embodiments of the present disclosure improve the efficiency and timeliness of interactive communications between the second client and the first client.

It should be understood that the above general descriptions and the following detailed descriptions are merely for exemplary, and cannot limit the present disclosure.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1A:
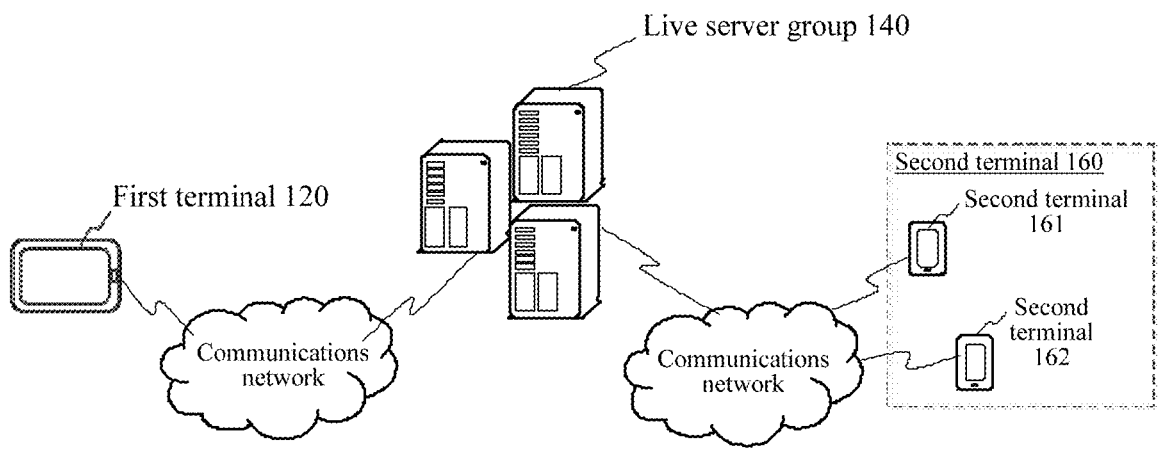
FIG. 1A and FIG. 1B are schematic structural diagrams of a live broadcasting system according to an embodiment of the present disclosure.

FIG. 1A is a schematic structural diagram of a live broadcasting system according to an embodiment of the present disclosure. The live broadcasting system includes a first terminal 120, a live backstage 140, and a second terminal 160.

A first client runs on the first terminal 120. The first terminal 120 may be a mobile phone, a tablet computer, an e-book reader, an MP3 (Moving Picture Experts Group Audio Layer III) player, MP4 (Moving Picture Experts Group Audio Layer IV) player, a laptop computer, a desktop computer or the like. The first client is configured to record a live video stream of an anchor in a live room, and broadcast the live video stream to a software client of the live backstage 140. In some embodiments, the first client may also serve as a viewer client application, and any user may implement the function of an anchor or a viewer by using the live broadcasting or viewing functions provided by the client.

In the present disclosure, a first client, an anchor, an anchor user and an anchor client are used interchangeably to refer to a user and a user terminal that can broadcast a video stream in a live room. A second client, a viewer, a viewer user, and a viewer client are used interchangeably to refer to a user and user terminal that can watch a video stream in a live room broadcasted by the anchor and interact with the anchor. Further, in the present disclosure, a live room refers to an online video chat room or a live broadcasting room, in which an anchor user may broadcast in audio and video forms to one or more viewer users. The view users may watch the video stream and communicate with the anchor user though online text, audio, or video exchanges.

The live backstage 140 is a server, or formed by several servers, or a virtualization platform, or a cloud computing service center. Optionally, the live backstage 140 includes a server configured to implement a live function, a server configured to implement user account management, a server configured to implement live room management, and a server configured to implement an interactive video. Optionally, the live backstage 140 includes a video server, a picture server, and the like. It should be noted that, each server may maintain a corresponding database. For example, the server configured to implement user account management may maintain a user account database, to store user related information such as a user account, for query when an account management function is implemented.

The live backstage 140 is connected to the second terminal 160 through a communications network. Optionally, the communications network is a wired network or a wireless network.

A second client runs on the second terminal 160. The second terminal 160 may be a mobile phone, a tablet computer, an e-book reader, an MP3 (Moving Picture Experts Group Audio Layer III) player, MP4 (Moving Picture Experts Group Audio Layer IV) player, a laptop computer, a desktop computer or the like. The second client is a client configured to watch a live video stream from a live room.

There may be two or more second terminals 160, including a second terminal 161 and a second terminal 162. A second client A runs on the second terminal 161, and a second client B runs on the second terminal 162. The second terminal 161 is configured to receive a live video stream and an interactive video sent by the live backstage 140, record the interactive video when watching a live video stream, and send the interactive video stream to the live backstage 140. The second terminal 162 is another second terminal apart from the second terminal 161, and is configured to receive the live video stream and the interactive video sent by the live backstage 140. Optionally, there may be one or more second terminals 161 and one or more second terminals 162.

Generally, the first terminal 120 sends a live video stream to the live backstage 140, and the live backstage 140 receives the live video stream and transfers the live video stream to the first terminal 120, the second terminal 161, and the second terminal 162.

In a process of watching the live video stream, the second terminal 161 may send an interactive video to the live backstage 140, and the live backstage 140 may receive the interactive video and transfer the interactive video to the first terminal 120, the second terminal 161, and the second terminal 162 in the same online live room. The interactive video is a video that can be used to play in PIP mode on an area of a live video stream screen on the first client and/or the second client. In some embodiments, the interactive video can be played in PIP mode on any part of the live video stream screen. In some embodiments, the interactive video may also be played in a split screen mode together with the live video stream on one display screen.

Optionally, the wireless network or wired network uses a standard communications technology and/or protocol. The network is generally the Internet, but may also be any network, including but not limited to any combination of a Local Area Network (LAN), a Metropolitan Area Network (MAN), a Wide Area Network (WAN), a mobile network, a wired or wireless network, and a private network or a virtual private network). In some embodiments, a technology and/or format including a Hyper Text Mark-up Language (HTML), an Extensible Markup Language (XML) are/is used to represent data exchanged by using the network. In addition, a conventional encryption technology such as Secure Socket Layer (SSL), Transport Layer Security (TLS), Virtual Private Network (VPN), or Internet Protocol Security (IPsec) may also be used to encrypt all or some links. In some other embodiments, a customized and/or dedicated data communications technology may also be used to replace or supplement the foregoing data communications technology.

Figure 1B:
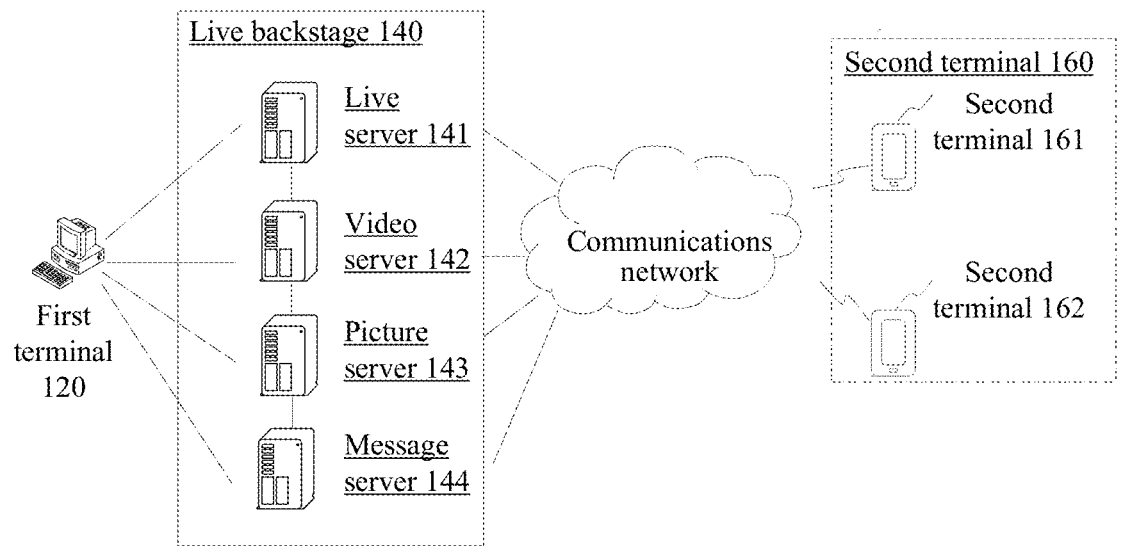

In a specific embodiment, referring to FIG. 1B, the live backstage 140 includes: a live server 141, a video server 142, a picture server 143, and a message server 144.

The live server 141 is configured to receive a live video stream sent by a first client, and transfer the live video stream to the first client, the second client A, and the second client B in the same online live room.

The video server 142 is configured to receive an interactive video sent by the second client A, and store the interactive video. The first client, the second client A, and the second client B in the same online live room may transfer the interactive video, and download the interactive video. The interactive video is a video that can be played on a local area of the live interface.

The picture server 143 is configured to receive a cover of the interactive video sent by the second client A, store the cover of the interactive video, and receive downloading of the first client, the second client A, and the second client B in the same live room for the cover of the interactive video.

The message server 144 is configured to receive a video message sent by the second client A, and transfers the video message to the first client, the second client A, and the second client B. Alternatively, the message server 144 generates a video message according to the interactive video sent by the second client A, and transfers the video message to the first client, the second client A, and the second client B.

Figure 2:
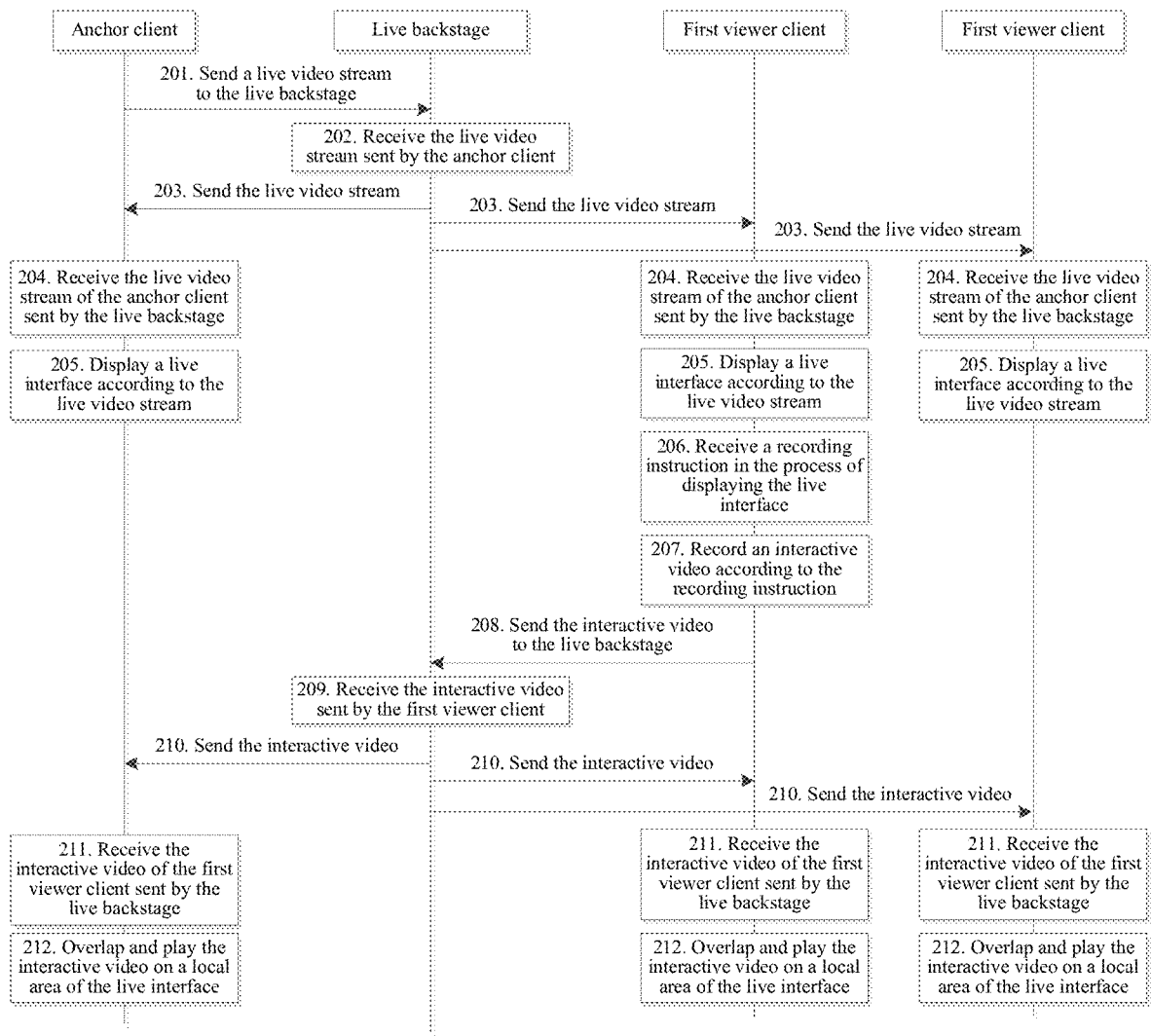
FIG. 2 is a method flowchart of an interactive method in a live room according to an embodiment of the present disclosure.

For ease of understanding data flows of this solution, in subsequent embodiments, the first client serves as an anchor client, the first terminal serves as an anchor terminal, the second client serves as a viewer client, and the second terminal serves as a viewer terminal. For distinguishing an initiation client of the interactive video, the second client is further classified into a first viewer client and a second viewer client. Referring to FIG. 2, FIG. 2 shows a method flowchart of an interactive method in a live room according to an embodiment of the present disclosure. In this embodiment, that the interactive method in a live room is applied to the live broadcasting system in FIG. 1A or FIG. 1B is used as an example for description. The interactive method in a live room includes:

Step 201. An anchor client sends a live video stream to a live backstage.

Step 202. The live backstage receives the live video stream sent by the anchor client.

Step 203. The live backstage sends the live video stream to a client in a live room.

Optionally, the client in the live room includes an anchor client and/or a viewer client. The viewer client includes: a first viewer client and a second viewer client.

Optionally, there are one or more first viewer clients. There are zero or more second viewer clients. There are usually multiple second viewer clients.

Step 204. The anchor client/first viewer client/second viewer client receives the live video stream of the anchor client sent by the live backstage.

Step 205. The anchor client/first viewer client/second viewer client displays a live interface according to the live video stream.

Optionally, the anchor client/first viewer client/second viewer client displays the live interface according to the live video stream.

The live interface includes: a live image, and a live information area. The live image is an image generated according to the live video stream. The live information area includes at least one piece of information: a live room name, an anchor account, an anchor icon, a viewer user account, a viewer icon, followers of the anchor, a popularity index of the anchor, or a ranking of gifts received by the anchor.

Optionally, the anchor interface further includes: a comment message area. The comment message area is used to display a comment message post by the anchor client and/or the viewer client.

Step 206. The first viewer client receives a recording instruction in the process of displaying the live interface.

Step 207. The first viewer client records an interactive video according to the recording instruction.

The interactive video is a video whose video duration is less than a preset threshold. The interactive video is a video that can be played in a picture-in-picture mode or split screen mode by the anchor client and/or the viewer client to play on an area of the live interface.

Optionally, the interactive video is a video whose duration is 2 s to 6 s.

Step 208. The first viewer client sends the interactive video to the live backstage.

Step 209. The live backstage receives the interactive video sent by the first viewer client.

Step 210. The live backstage sends the interactive video to the client in the online live room.

Optionally, the client in the live room includes an anchor client and/or a viewer client. The viewer client includes: a first viewer client and a second viewer client.

Optionally, there are one or more first viewer clients. There are zero or more second viewer clients. Often there are multiple second viewer clients.

Step 211. The anchor client/first viewer client/second viewer client receives the interactive video of the first viewer client sent by the live backstage.

Step 212. The anchor client/first viewer client/second viewer client displays in picture-in-picture (PIP) mode and plays the interactive video on a local area of the live interface.

Optionally, the PIP area is located at the lower side of the live interface, and the PIP area is a circular area.

Figure 3:
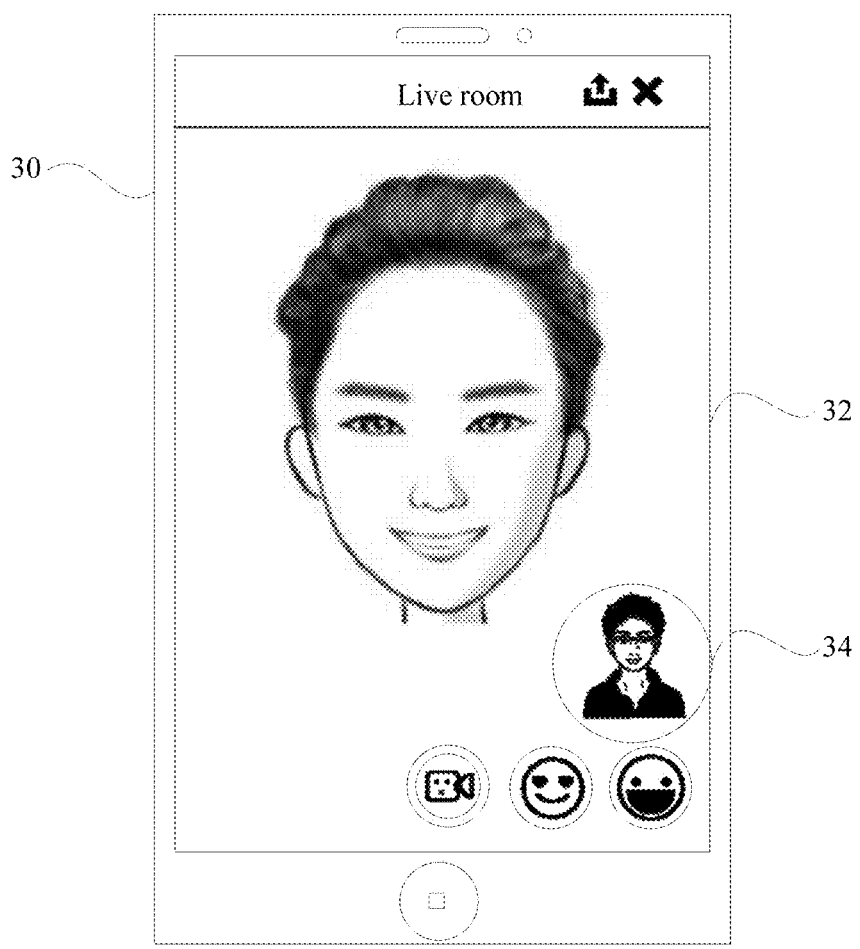
FIG. 3 is a schematic diagram of an interface of a live room displayed by a client according to an embodiment of the present disclosure.

For example, referring to FIG. 3, the live interface 30 displays a live image of an anchor 32. A circular area 34 exists on the lower right side of the live interface 30, and the circular area 34 displays the interactive video of the first viewer client.

Optionally, the PIP area occupied by the interactive video avoids blocking the live image in the live interface, and the play volume of the interactive video is less than the play volume of the live video stream.

In summary, in the interactive method in a live room provided in this embodiment, an interactive video of a viewer client is obtained from a live backstage, where the interactive video is a video whose video duration is less than a preset threshold, and the interactive video is played in PIP mode of a live interface, so that a manner for the viewer client to interact with an anchor client can also be implemented in a video form, thereby resolving the problem in the existing technology that the operational complexity for the viewer client to perform interaction is far larger than the operational complexity for the anchor client to perform interaction, so that the viewer client can interact with the anchor client by using the interactive video. A recording operation of the interactive video is relatively easy, so that the viewer client can implement interaction without complex operations, thereby improving the efficiency and timeliness obtained when the viewer client interacts with the anchor client.

This embodiment of the present disclosure involves two processes: a recording process of the interactive video and a playing process of the interactive video.

The recording process of the interactive video is described below by using the embodiment in FIG. 4.

The playing process of the interactive video is described below by using the embodiment in FIG. 6.

Figure 4:
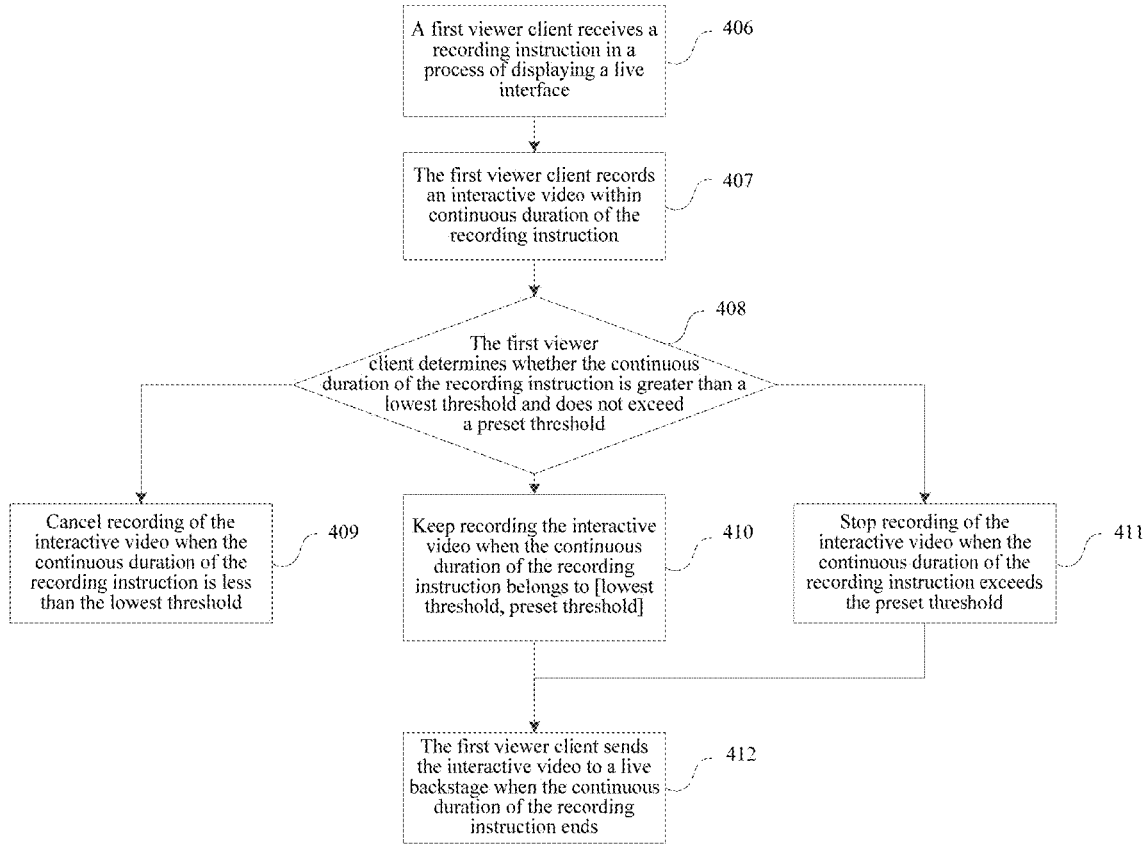
FIG. 4 is a flowchart of a method for recording an interactive video in a live room according to an embodiment of the present disclosure.

In one embodiment based on FIG. 2, step 206 to step 208 related to the recording process are alternatively implemented as step 406 to step 412, as shown in FIG. 4:

Step 406. The first viewer client receives a recording instruction in the process of displaying the live interface.

optionally, the recording instruction is an instruction that can be triggered continuously. For example, the recording instruction is an instruction triggered by long-pressing a recording button. The recording button is a button control displayed on the live interface in advance, or the recording button is a preset physical button on a first viewer terminal. When the recording button is in a pressed state, trigger a continuous recording instruction, to record the interactive video continuously.

Figure 5:
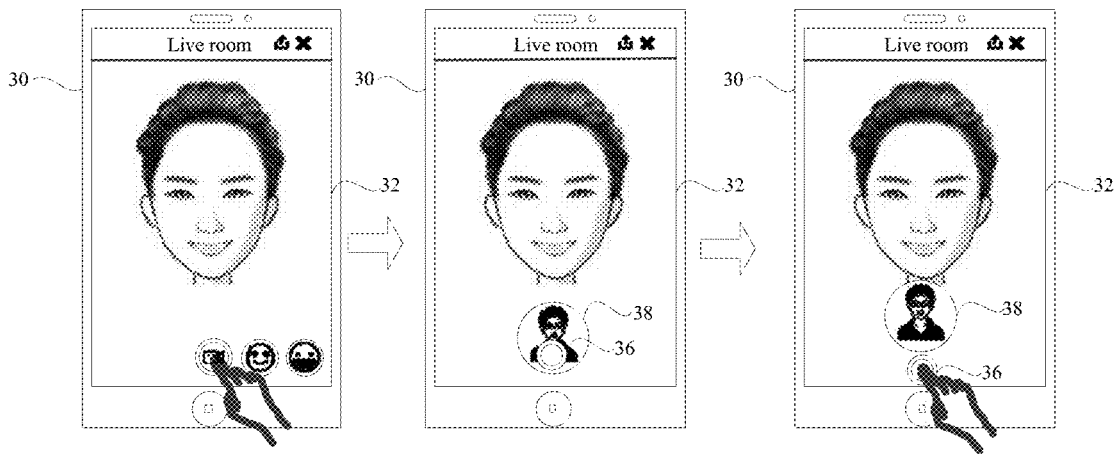
FIG. 5 is a schematic diagram of an interface of an interactive video recorded in a live room and displayed by a client according to an embodiment of the present disclosure.

For example, referring to FIG. 5, the first viewer client displays a recording button 36 on a live interface 32. When the recording button 36 is pressed by a user continuously, the first viewer client is triggered to generate a recording instruction. If the continuous duration of the user pressing the recording button 36 is 1 s, a one-second recording instruction is generated. If the continuous duration of the user pressing the recording button 36 is 2 s, a two-second recording instruction is generated.

Step 407. The first viewer client records an interactive video within the continuous duration of the recording instruction.

Within the continuous duration of the recording instruction, the first viewer client records the interactive video continuously. Optionally, to avoid the impact of sound from the live on the recording, in the process of recording the interactive video, playing of the sound of the live video stream is stopped until the recording of the interactive video ends, and the playing of the sound of the live video stream is resumed. The process may include: stopping the sound of the live video stream when receiving the recording instruction, and playing the sound of the live video stream when detecting that the recording of the interactive video ends. The stopping playing the sound of the live video stream may be reducing the volume of the live video stream to 0, or stopping audio parsing for the live video stream, so that the live video stream is muted. This disclosure does not specifically limit the foregoing stopping manners.

In the process of recording the interactive video, the first viewer client displays a preview window of the interactive video on the PIP area of the live interface. As shown in FIG. 5, the first viewer client displays the recording button 36 on the live interface 32. After the recording button 36 is pressed, the first viewer client displays a preview window 38 of the interactive video at the upper side of the recording button 36. In some embodiments, a display area of the preview window 38 is a circular area. In some embodiments, the PIP area may be set by a user of the second viewer client. For example, before recording is started, a setting option of the preview area may be provided, so that the user may set, according to a watching habit of the user, which area displays the preview window.

It should be noted that, the recording process may be recording a video image of the user by using a recording apparatus on a viewer terminal, and collecting sound of the user by using a sound receiving apparatus on the viewer terminal.

Step 408. The first viewer client determines whether the continuous duration of the recording instruction is greater than a lowest threshold and does not exceed the preset threshold.

Because the video duration of the interactive video needs to belong to [lowest threshold, preset threshold], where for example, the lowest threshold is 2 s, and the preset threshold is 6 s, the first viewer client determines whether the continuous duration of the recording instruction belongs to [lowest threshold, preset threshold].

If the continuous duration of the recording instruction is less than the lowest threshold, enter step 409.

If the continuous duration of the recording instruction belongs to [lowest threshold, preset threshold], enter step 410.

If the continuous duration of the recording instruction is greater than the preset threshold, enter step 411.

Step 409. Cancel the recording of the interactive video when the continuous duration of the recording instruction is less than the lowest threshold.

When the continuous duration of the recording instruction is less than 2 s, the first viewer client determines that this record is an invalid record. The first viewer client cancels the recording of the interactive video, and deletes a video file of the recorded interactive video.

Step 410. Keep recording the interactive video when the continuous duration of the recording instruction belongs to [lowest threshold, preset threshold].

When the continuous duration of the recording instruction belongs to [2 s, 6 s], the first viewer client records the interactive video continuously.

In some embodiments, the setting of the lowest threshold may also avoid a faulty operation, and provide higher operational flexibility. Once a user touches a recording button by mistake, due to a general short time of a fault touch operation, a lowest threshold may be set to determine whether an operation is a fault touch operation, to determine whether to continue recording. In addition, the user may want to cancel the recording at the beginning of the recording. Therefore, setting the lowest threshold may further be a convenient operational manner for the user to cancel the recording.

Step 411. Stop the recording of the interactive video when the continuous duration of the recording instruction exceeds the preset threshold.

When the continuous duration of the recording instruction exceeds 6 s, the first viewer client stops the recording of the interactive video. In other words, in this example, in each recording process, the video duration of the interactive video recorded by the first viewer client is 6 s at most. The continuous duration may limit the length of the interactive video, so that when the interactive video is added to the live video stream to play, original content of the live video stream is not affected for by a long play time.

Step 412. The first viewer client sends the interactive video to the live backstage when the continuous duration of the recording instruction ends.

After the user long-presses the recording button for a period of time, the user releases the recording button, so that the continuous duration of the recording instruction ends. When the recording instruction ends, the first viewer client sends the interactive video to the live server.

Optionally, the first viewer client sends the interactive video in a video message form to the live backstage. The live backstage includes: a picture server and a video server. The first viewer client generates a video message identifier, the first viewer client sends the video message identifier and the interactive video to the video server, and the video server stores the video message identifier and the interactive video. The first viewer client further intercepts a frame of image in the interactive video as a cover. For example, a first frame of image in the interactive video is intercepted as a cover, or a frame of image including a human face in the interactive video is intercepted as a cover, or a last frame of image in the interactive video is intercepted as a cover. The first viewer client sends the video message identifier and the cover of the interactive video to the picture server, and the picture server stores the video message identifier and the cover of the interactive video.

In other words, the first viewer client not only can send a comment message in a text form to the live backstage, but also can send a comment message in a video form to the live backstage.

Optionally, the first viewer client further compresses the interactive video before sending interactive video.

Optionally, before sending the interactive video, the first viewer client further performs special effect processing on the interactive video according to a preset filter. The preset filter includes at least one of a beautification filter, a stylization filter, a brush stroke filter, and a sketch filter.

The beautification filter is achieving a beautification effect by mean of functions such as whitening, retouching, and refreshing. The stylization filter is generating a painting or impressionistic effect in a selection area by replacing pixels and by searching and increasing the contrast of an image. The brush stroke filter is stroking by simulating different brushes and inks to create a painting effect. The sketch filter is simplifying colors of an image by creating a hand-painted image effect. In some embodiments, the preset filter may be selected by a user of the second viewer client, to achieve an expected effect. Optionally, the first viewer client supports a gesture operation in a recording process. Optionally, the live interface includes a live image, a preview window, and a recording button. The first viewer client receives a double-click signal that acts on the preview window, and switches to a front camera or a rear camera according to the double-click signal, as the camera used in the recording process. The front camera is a camera used in the recording process by default. Optionally, the first viewer client receives a slide-up instruction in the process of recording the interactive video, and cancels the recording of the interactive video according to the slide-up instruction. In addition, it should be noted that, the interactive method may be further targeted for a user with an interactive authority. The interactive authority may be determined according to a user level, or may be applied for by a user and authorized by an anchor. This is not specifically limited in this disclosure.

In summary, in the interactive method in an online live room provided in this embodiment, video duration of an interactive video is controlled according to continuous duration of a recording instruction, so that the video duration of the interactive video is kept between 2 s and 6 s, normal play of a live video stream is not affected, and real-time interaction between multiple first viewer clients and an anchor client can be ensured.

In the interactive method in an online live room provided in this embodiment, the interactive video is further compressed, so that the transmission bandwidth occupied when the interactive video is transmitted and the storage space occupied when the interactive video is stored become smaller, thereby avoiding wastes of the transmission bandwidth and the storage space.

In the interactive method in a live room provided in this embodiment, special effect processing is further performed on the interactive video according to a preset filter, thereby optimizing the display effect of the interactive video.

Figure 6:
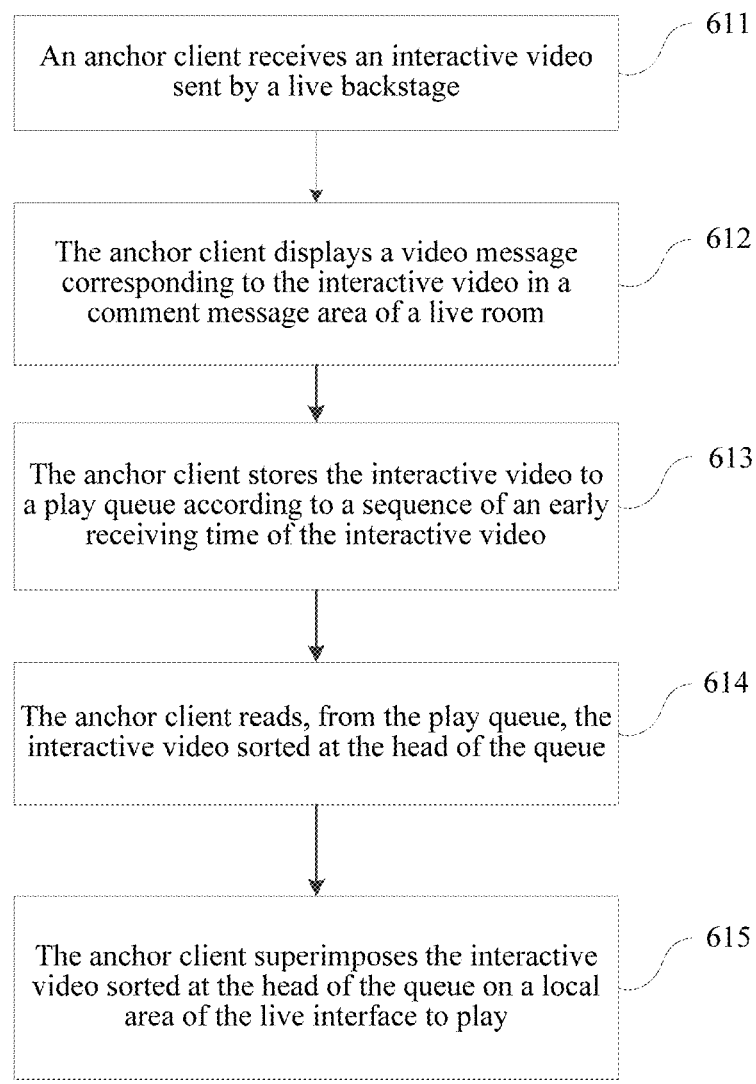
FIG. 6 is a flowchart of a method for playing an interactive video in a live room according to an embodiment of the present disclosure.

In one embodiment based on FIG. 2, step 211 to step 212 related to the playing process are alternatively implemented as step 611 to step 615, and an anchor client is used as an example, as shown in FIG. 6:

Step 611. The anchor client receives an interactive video sent by a live backstage.

Optionally, the anchor client receives the interactive video sent in a video message form by the live backstage. The video message carries a video message identifier.

Optionally, the live backstage includes: a picture server and a video server. The anchor client receives a video message corresponding to the interactive video, downloads a cover of the interactive video from a picture server according to the video message identifier, and the anchor client downloads the interactive video from the video server according to the video message identifier.

Step 612. The anchor client displays a video message corresponding to the interactive video in a comment message area of the live room.

Because the interactive video is sent in a video message form, the anchor client displays the video message corresponding to the interactive video in the comment message area of the live room. The video message displayed in the comment message area includes: a user account (or nickname) of the first viewer client and the cover of the interactive video. The cover of the interactive video is encapsulated into a triggerable control.

Figure 7A:
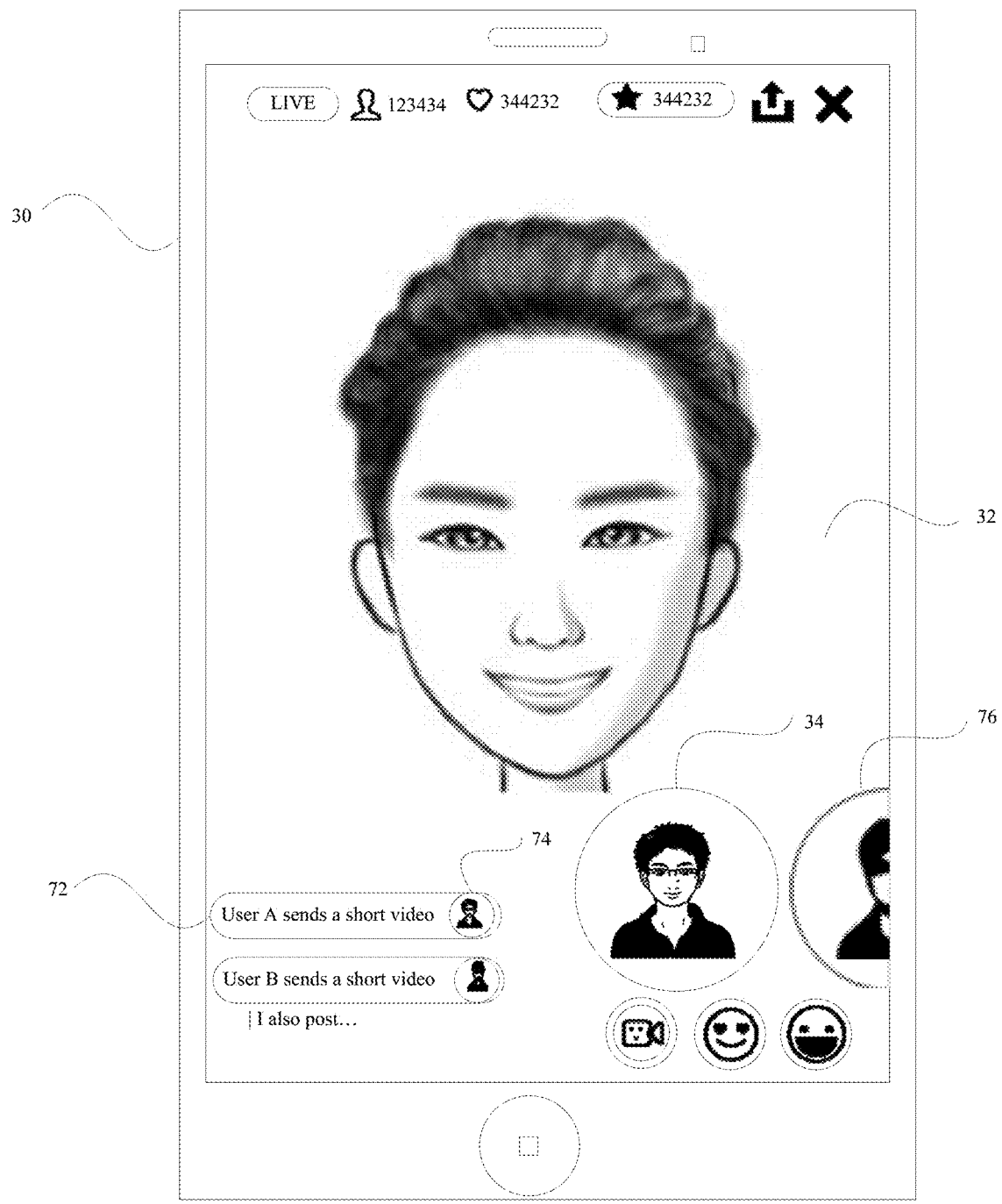
FIG. 7A and FIG. 7B are schematic diagrams of an interface of an interactive video played in a live room and displayed by a client according to an embodiment of the present disclosure.

As shown in FIG. 7A, the live interface 30 displays a comment message area 72, the comment message area 72 displays a video message: A user A sends a small video and a cover 74 of the interactive video.

Step 613. The anchor client stores the interactive video in a play queue according to a sequence of an early receiving time of the interactive video.

After downloading the interactive video from the video server, the anchor client stores the interactive video (or the video message or an identifier of the interactive video) to the play queue according to a sequence of receiving time of the interactive video.

Step 614. The anchor client reads, from the play queue, the interactive video sorted at the head of the queue.

Optionally, the anchor client determines whether the play queue is empty. When the play queue is not empty, the anchor client reads, from the play queue, the interactive video sorted at the head of the queue.

Step 615. The anchor client plays PIP the interactive video sorted at the head of the queue on an area of the live interface.

Optionally, the PIP area is located at the lower side of the live interface, and the PIP area is a circular area. The location of the PIP area may be changed according to adjusting of an anchor client user for the location.

Optionally, when there are two or more interactive videos in the play queue, the anchor client further displays a cover of a to-be-played interactive video around the PIP area of the live interface.

As shown in FIG. 7A, a circular area 34 exists on the lower right side of the live interface 30, and the circular area 34 displays the interactive video of the first viewer client. Because there are multiple interactive videos in the play queue, the anchor client further displays a cover 76 of a to-be-played interactive video at the right side of the circular area 34.

After the user observes the cover 76 of the interactive video, the user can learn that there are still interactive videos to be played.

By continuously performing step 614 and step 615, the anchor client can play the interactive videos in the play queue successively and completely according to a sequence of an early receiving time of the interactive videos.

In the process of playing the interactive video, if the user does not want to watch a currently played interactive video, the anchor client receives a play cancellation instruction of the user, and stops playing the currently played interactive video and automatically plays a next interactive video. Optionally, the play cancellation instruction is a left-slide instruction that acts on the currently played interactive video. Optionally, the currently played interactive video is stopped in a fade-out manner, and the next interactive video moves to the PIP area in a fade-in manner to play.

Figure 7B:
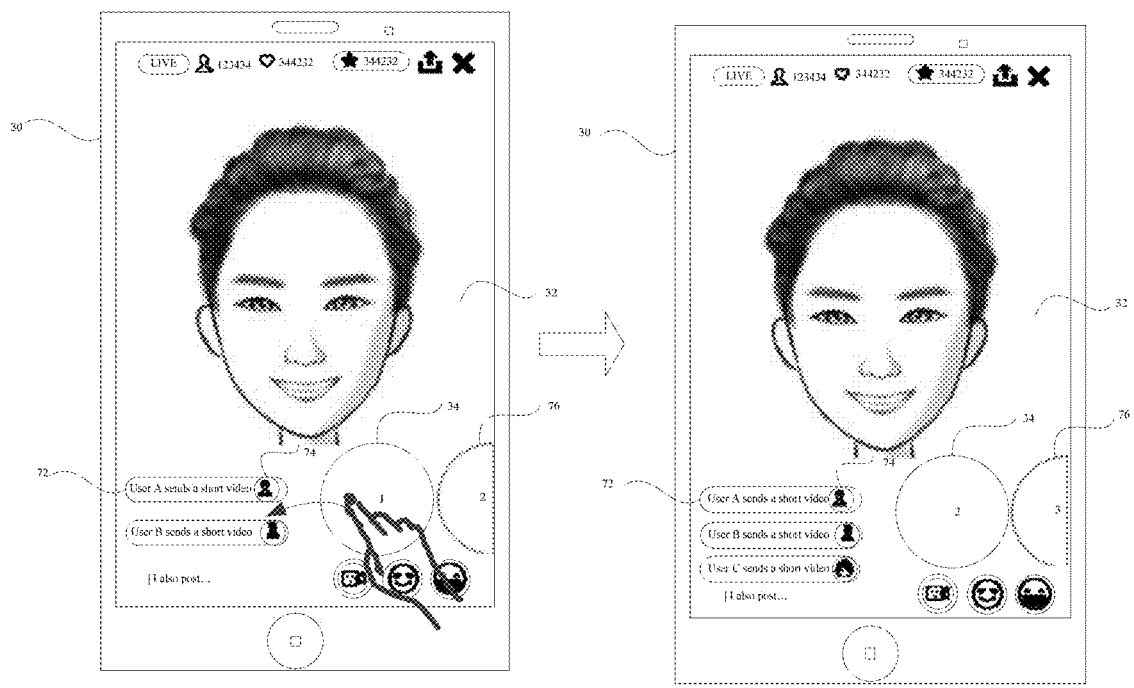

As shown in FIG. 7B, an interactive video 1 is played at the lower side of the live interface 30. After a left-slide instruction that acts on the interactive video 1 is received, the interactive video 1 is stopped to the left in a fade-out manner, and a next interactive video 2 moves to the left to the circular area 34 in a fade-in manner to play.

In summary, in the interactive method in a live room provided in this embodiment, multiple interactive videos are stored in a play queue in a sequence of an early receiving time of the interactive videos, and the interactive videos in the play queue are played successively, so that the user does not need to actively control the playing process of the interactive video, thereby reducing the operational complexity for the user.

In the interactive method in a live room provided in this embodiment, a play cancellation instruction is further provided, so that the user can skip playing a disliked interactive video, and control the playing process.

Figure 8:
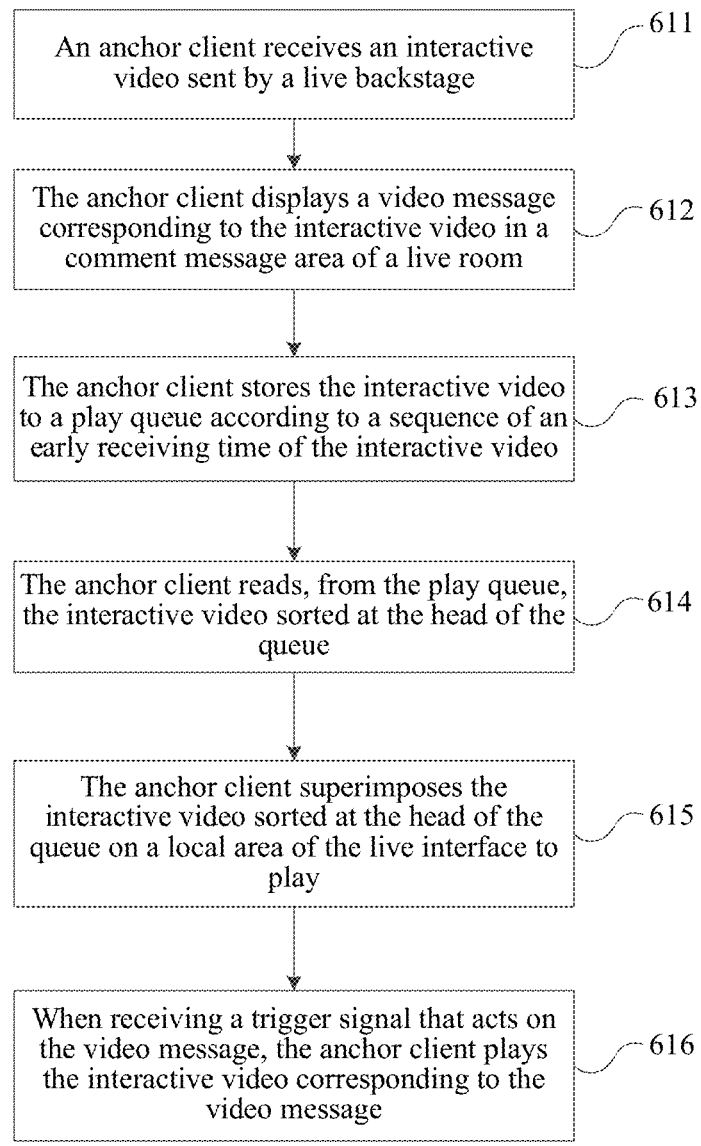
FIG. 8 is a flowchart of a method for playing an interactive video in a live room according to another embodiment of the present disclosure.

In one embodiment based on the embodiment shown in FIG. 6, after step 615, step 616 is further included, as shown in FIG. 8.

Step 616. When receiving a trigger signal that acts on the video message, the anchor client plays the interactive video corresponding to the video message.

The comment message area in the live interface displays a video message corresponding to an interactive video sent by each first viewer client. If an anchor wants to replay or quickly play an interactive video sent by a first viewer client, the anchor clicks a video message of the first viewer client in the comment message area. When receiving the trigger signal that acts on the video message, the anchor client plays the interactive video corresponding to the video message.

This step includes the following steps:

First, when receiving the trigger signal that acts on the video message, the anchor client detects whether an interactive video is being played.

Second, if no interactive video is being played, play an interactive video corresponding to the video message.

Third, if an interactive video is being played, pause the interactive video that is being played, and play an inter-cut interactive video corresponding to the video message.

Fourth, after the playing of the inter-cut interactive video is completed, continue to play or replay the paused interactive video.

Figure 9:
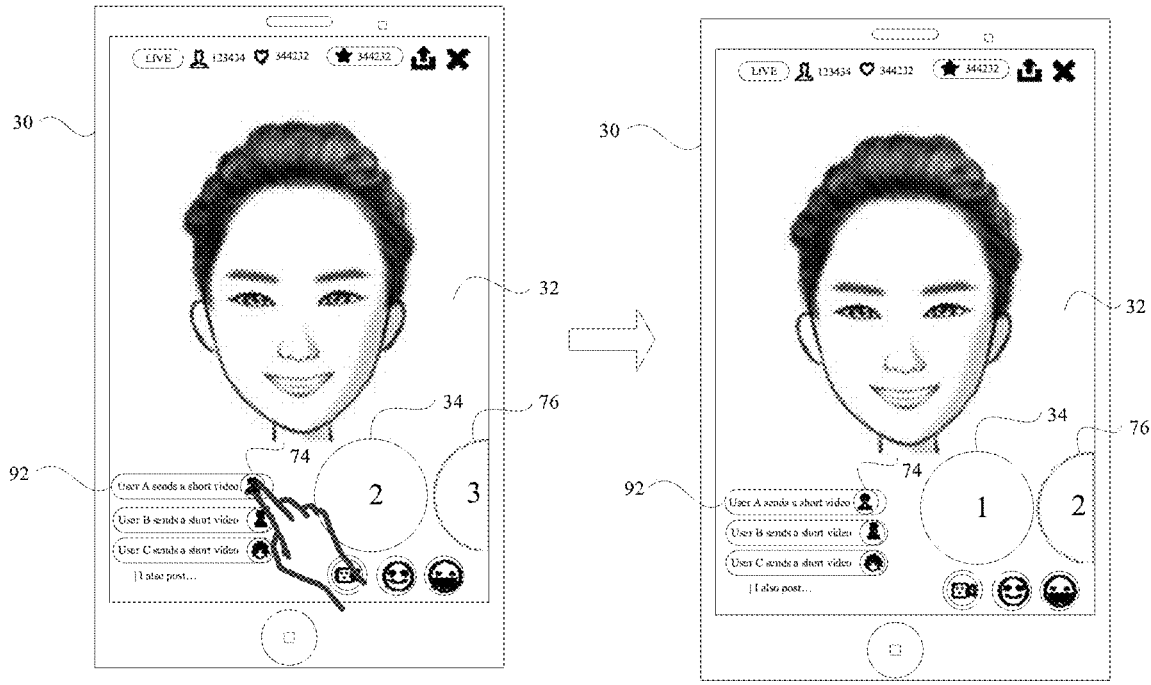
FIG. 9 is a schematic diagram of an interface that an inter-cut interactive video is played in a live room according to an embodiment of the present disclosure.

For example, as shown in FIG. 9, a local area 34 of the live interface 30 plays an interactive video 2, and a comment message area of the live interface 30 displays a video message 92. When the video message 92 receives a click signal, the anchor client pauses the interactive video 2, and plays an interactive video 1 corresponding to the video message 92, and continues to play the interactive video 2 after the interactive video 1 is played completely.

It should be noted that, the steps in the embodiments shown in FIG. 6 and FIG. 8 may be further performed by the first viewer client or the second viewer client.

In summary, because the video duration of the interactive video is short, by means of an inter-cut mechanism, the user can replay or quickly play a specified interactive video by using the video message in the comment message area, so that the user can control the playing process of the interactive video, thereby improving the interactive effect of the interactive video.

Figure 10:
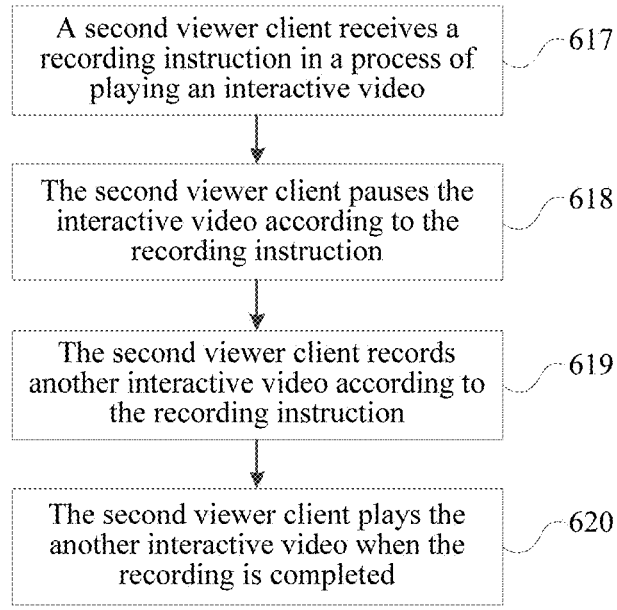
FIG. 10 is a flowchart of a method for playing an interactive video in a live room according to still another embodiment of the present disclosure.

In one embodiment based on the embodiment shown in FIG. 6, if the steps in the embodiment shown in FIG. 6 and FIG. 8 are implemented by the viewer client, the viewer client may further continue to record the interactive video in the process of playing the interactive video. After step 615, step 617 to step 620 are further included, as shown in FIG. 10.

Step 617. The second viewer client receives the recording instruction in the process of playing the interactive video.

Optionally, the recording instruction is an instruction triggered continuously. For example, the recording instruction is an instruction triggered by long-pressing a recording button. The recording button is a button control displayed on the live interface in advance, or the recording button is a preset physical button on a first viewer terminal.

Step 618. The second viewer client pauses the interactive video according to the recording instruction.

Step 619. The second viewer client records another interactive video according to the recording instruction.

Step 620. The second viewer client plays the another interactive video when the recording is completed. In another embodiment, the second viewer client continues to play or replays the paused interactive video when the recording of the another interactive video is completed.

In summary, in the interactive method of a live room provided in this embodiment, in the process of playing the interactive video, the viewer client records another interactive video, and continues to play or replays the paused interactive video after the recording is completed, so that the process of playing the interactive video does not affect the process of recording another interactive video, thereby implementing compatibility of the playing process and the recording process.

It should be noted that, the "interactive video" mentioned in the foregoing embodiments may be referred to as a short video, a small video, or a micro video in different embodiments. The embodiments of the present disclosure do not limit the name form of the interactive video.

Figure 11:
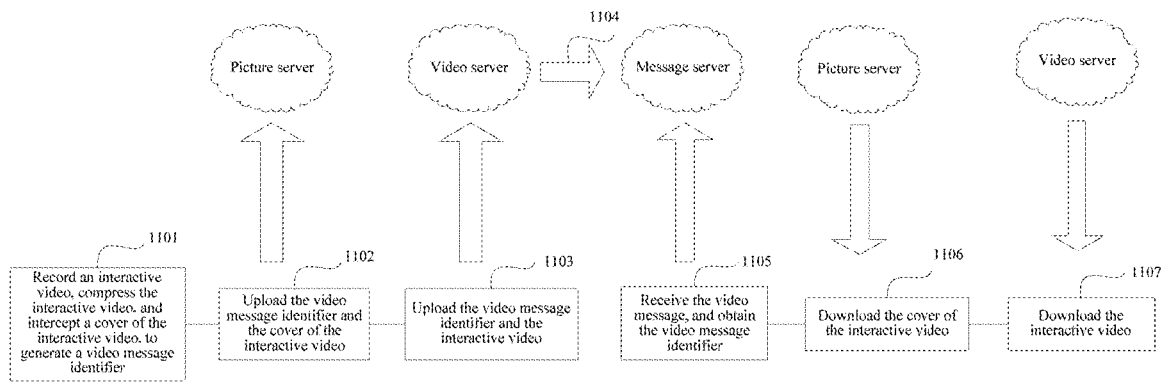
FIG. 11 is a schematic principle diagram of an interactive method in a live room according to an embodiment of the present disclosure.

FIG. 11 shows a schematic principle diagram of an interactive method in a live room according to an embodiment of the present disclosure. In a first phase 1101, a first viewer client records an interactive video, compresses the interactive video, and intercepts a cover of the interactive video, and the first viewer client further generates a video message identifier; in a second phase 1102, the first viewer client uploads the video message identifier and the cover of the interactive video to a picture server; in a third phase 1103, the first viewer client uploads the video message identifier and the interactive video to a video server; in a fourth phase 1104, the first viewer client sends the video message to a message server, where the video message carries the video message identifier; in a fifth phase 1105, an anchor client, the first viewer client, and a second viewer client that belong to a same live room receive the video message, and obtain the video message identifier from the video message; in a sixth phase 1106, the anchor client, the first viewer client, and the second viewer client download the cover of the interactive video from the picture server according to the video message identifier in the video message; in a seventh phase 1107, the anchor client, the first viewer client, and the second viewer client download the interactive video from the video server according to the video message identifier in the video message; and in an eighth phase, the anchor client, the first viewer client, and the second viewer client play the interactive video.

Figure 12:
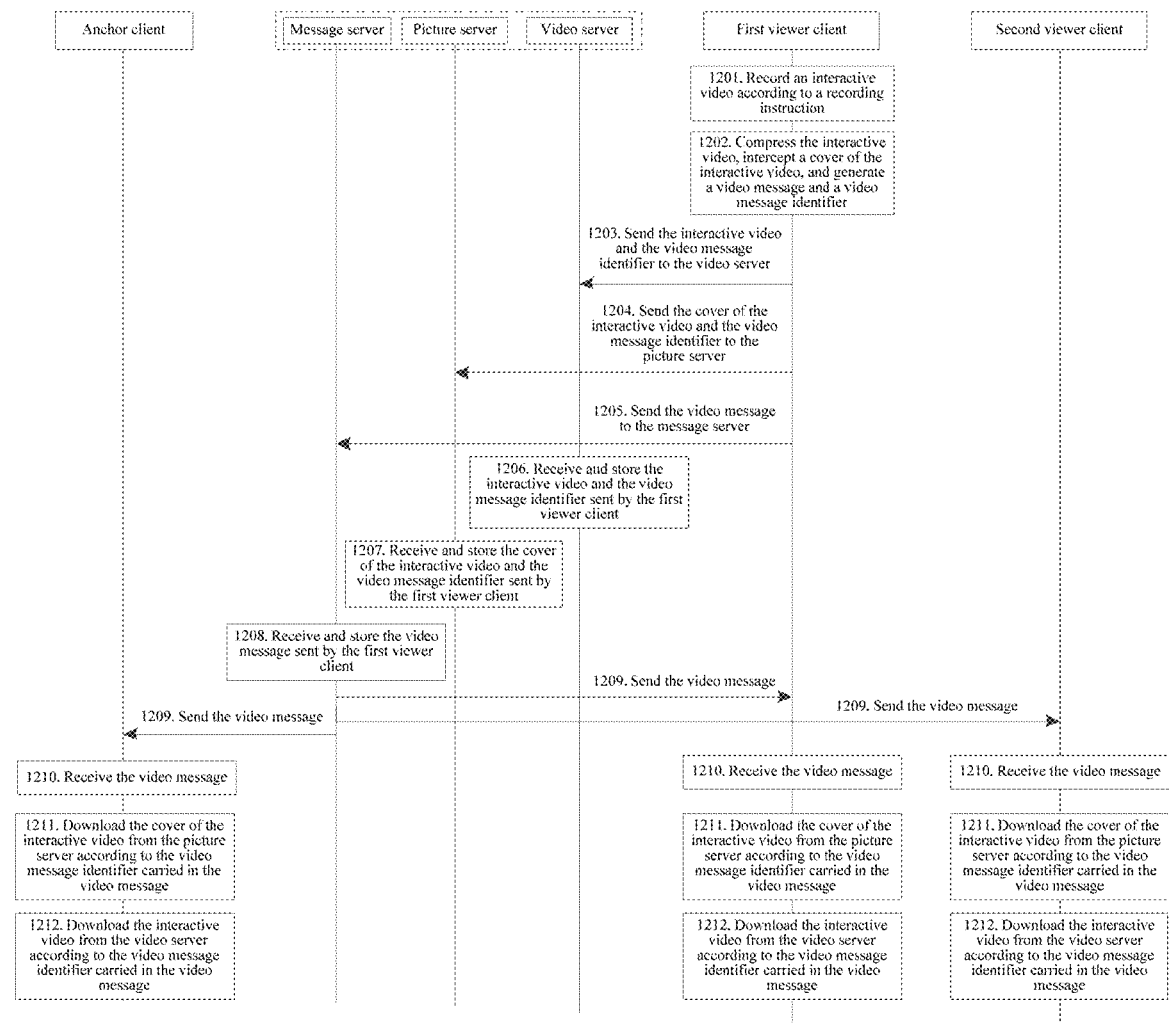
FIG. 12 is a method flowchart of an interactive method in a live room according to another embodiment of the present disclosure.

In one embodiment based on FIG. 2, step 207 to step 211 are alternatively implemented as step 1201 to step 1208, as shown in FIG. 12:

Step 1201. A first viewer client records an interactive video according to a recording instruction.

Optionally, the interactive video is a video whose video duration is less than a preset threshold. The interactive video is used to be played in PIP mode by an anchor client and/or a viewer client on an area of a live interface.

Optionally, the interactive video is a video whose duration is 2 s to 6 s.

Step 1202. The first viewer client compresses the interactive video, intercepts a cover of the interactive video, and generates a video message and a video message identifier.

Optionally, the video message carries the video message identifier.

Step 1203. The first viewer client sends the interactive video and the video message identifier to a video server.

Step 1204. The first viewer client sends the cover of the interactive video and the video message identifier to a picture server.

Step 1205. The first viewer client sends the video message to a message server.

Step 1206. The video server receives and stores the interactive video and the video message identifier sent by the first viewer client.

Step 1207. The picture server receives and stores the cover of the interactive video and the video message identifier sent by the first viewer client.

Step 1208. The message server receives and stores the video message sent by the first viewer client.

Step 1209. The message server sends the video message to the anchor client, the first viewer client, and the second viewer client.

Step 1210. The anchor client, the first viewer client, and the second viewer client receive the video message.

Step 1211. The anchor client, the first viewer client, and the second viewer client download the cover of the interactive video from the picture server according to the video message identifier carried in the video message.

Step 1212. The anchor client, the first viewer client, and the second viewer client download the interactive video from the video server according to the video message identifier carried in the video message.

In summary, in the interactive method in a live room provided in this embodiment, the interactive video is compressed, so that the transmission bandwidth occupied when the interactive video is transmitted and the storage space occupied when the interactive video is stored become smaller, thereby avoiding wastes of the transmission bandwidth and the storage space.

Figure 13:
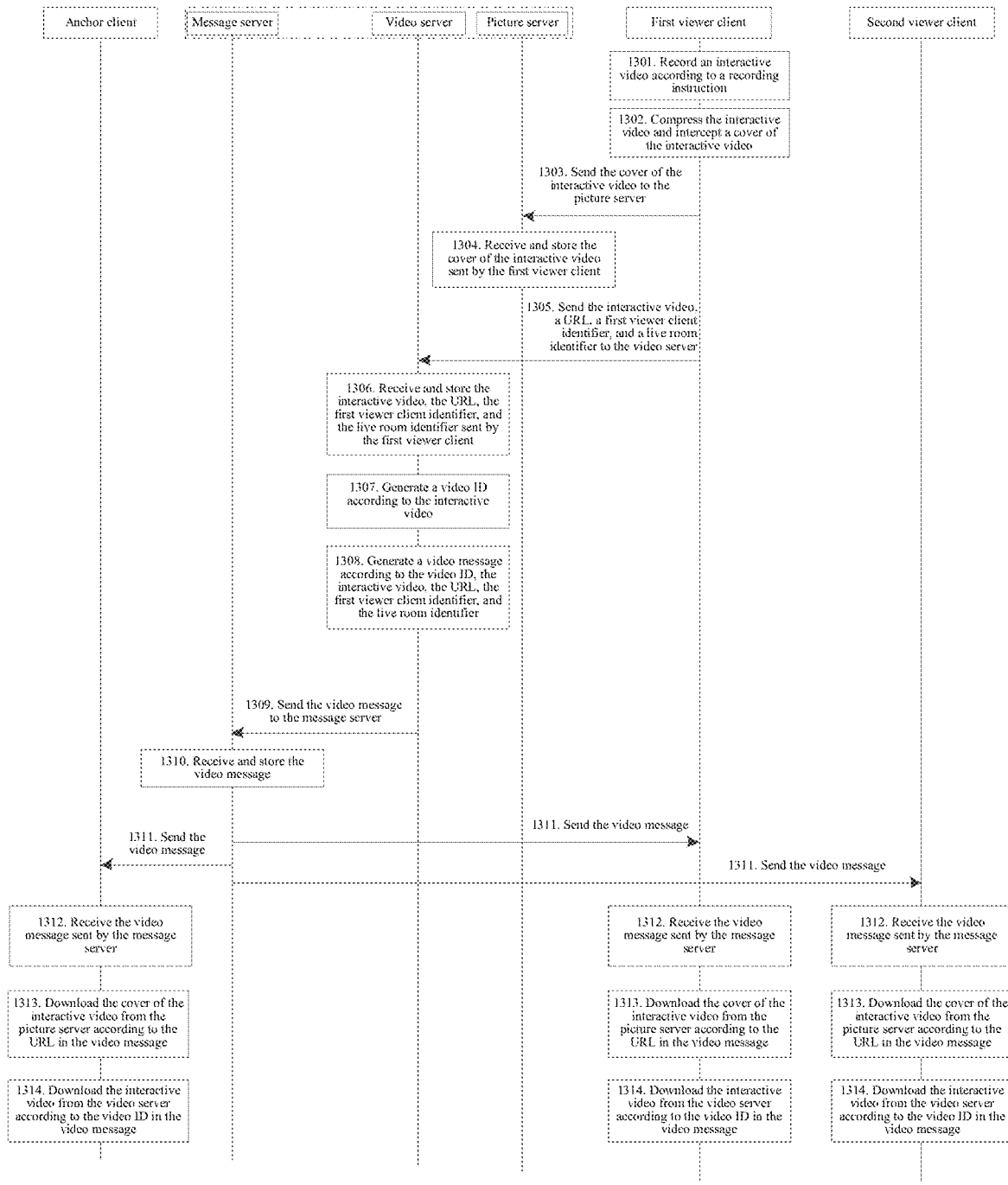
FIG. 13 is a method flowchart of an interactive method in a live room according to another embodiment of the present disclosure.

In one embodiment based on FIG. 2, step 207 to step 211 are alternatively implemented as step 1301 to step 1314, as shown in FIG. 13:

Step 1301. A first viewer client records an interactive video according to a recording instruction.

Optionally, the interactive video is a video whose video duration is less than a preset threshold. The interactive video is used to be played PIP by an anchor client and/or a viewer client on an area of the live interface.

Optionally, the interactive video is a video whose duration is 2 s to 6 s.

Step 1302. The first viewer client compresses the interactive video and intercepts a cover of the interactive video.

Step 1303. The first viewer client sends the cover of the interactive video to a picture server.

Step 1304. The picture server receives and stores the cover of the interactive video sent by the first viewer client.

The picture server stores the cover of the interactive video, and the picture server generates a URL according to a storage address of the cover of the interactive video.

The picture server sends the URL to the first viewer client, and the first viewer client receives the URL sent by the picture server.

Step 1305. The first viewer client sends the interactive video, the URL, a first viewer client identifier, and a live room identifier to a video server.

Step 1306. The video server receives and stores the interactive video, the URL, the first viewer client identifier, and the live room identifier sent by the first viewer client.

Step 1307. The video server generates a video ID according to the interactive video.

Step 1308. The video server generates a video message according to the video ID, the interactive video, the URL, the first viewer client identifier, and the live room identifier.

Step 1309. The video server sends the video message to a message server.

Step 1310. The message server receives and stores the video message.

Step 1311. The message server sends the video message to the anchor client, the first viewer client, and the second viewer client.

Step 1312. The anchor client, the first viewer client, and the second viewer client receive the video message sent by the message server.

Step 1313. The anchor client, the first viewer client, and the second viewer client download the cover of the interactive video from the picture server according to the URL in the video message.

Step 1314. The anchor client, the first viewer client, and the second viewer client download the interactive video from the video server according to the video ID in the video message.

Figure 14:
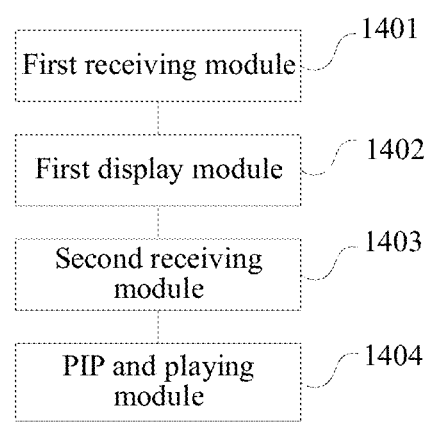
FIG. 14 is a structural block diagram of an interactive apparatus in a live room according to an embodiment of the present disclosure.

Referring to FIG. 14, FIG. 14 shows a structural block diagram of an interactive apparatus in a live room according to an embodiment of the present disclosure. The interactive apparatus in a live room may implement, by using a dedicated hardware circuit or a combination of software and hardware, all or a part that becomes a first terminal or a second terminal. The interactive apparatus in a live room includes: a first receiving module 1401, a first display module 1402, a second receiving module 1403, and a PIP and playing module 1404.

The first receiving module 1401 is configured to receive, from a live backstage, a live video stream sent by a first client.

The first display module 1402 is configured to display a live interface on a display screen according to the live video stream.

The second receiving module 1403 is configured to receive, from the live backstage, an interactive video sent by a second client.

Optionally, the second client and the first client belong to a same live room, and the interactive video is a video whose video duration is less than a preset threshold.

The PIP and playing module 1404 is configured to play in PIP mode the interactive video on an area of the live interface.

Figure 15:
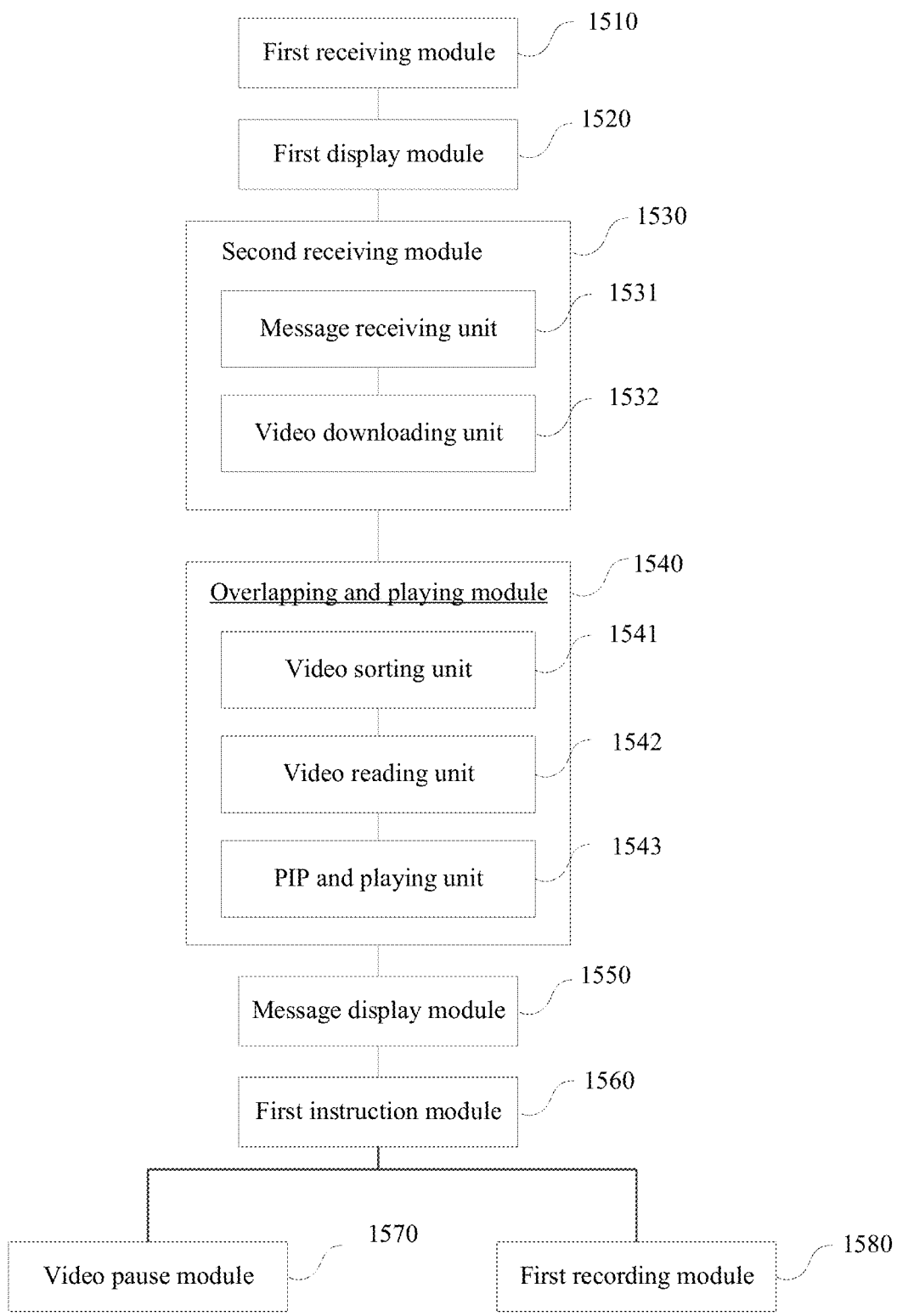
FIG. 15 is a structural block diagram of an interactive apparatus in a live room according to another embodiment of the present disclosure.

Referring to FIG. 15, FIG. 15 shows a structural block diagram of an interactive apparatus in a live room according to another embodiment of the present disclosure. The interactive apparatus in a live room may implement, by using a dedicated hardware circuit or a combination of software and hardware, all or a part that becomes a first terminal or a second terminal. The interactive apparatus in a live room includes: a first receiving module 1510, a second receiving module 1530, a second receiving module 1530, a PIP and playing module 1540, a message display module 1550, a first instruction module 1560, a video pause module 1570, and a first recording module 1580.

The first receiving module 1510 is configured to receive, from a live backstage, a live video stream sent by a first client.

The first display module 1520 is configured to display a live interface on a display screen according to the live video stream.

The second receiving module 1530 is configured to receive, from the live backstage, an interactive video sent by a second client.

Optionally, the second client and the first client belong to a same live room, and the interactive video is a video whose video duration is less than a preset threshold.

Optionally, the second receiving module 1530 includes a message receiving unit 1531 and a video downloading unit 1532.

The message receiving unit 1531 is configured to receive, from the live backstage, a video message corresponding to the interactive video.

The video downloading unit 1532 is configured to download the interactive video from the live backstage according to the video message.

The PIP and playing module 1540 is configured to play in PIP mode the interactive video on an area of the live interface.

Optionally, the PIP and playing module 1504 includes a video sorting unit 1541, a video reading unit 1542, and a PIP and playing unit 1543.

The video sorting unit 1541 is configured to store the interactive video in a play queue according to a sequence of an early receiving time of the interactive video.

The video read unit 1542 is configured to read, from the play queue, the interactive video sorted at the head of the queue.

The PIP and playing unit 1543 is configured to play in PIP the interactive video sorted at the head of the queue on one area of the live interface.

The message display module 1550 is configured to display the video message in a comment message area of the live room.

Optionally, the PIP and playing module 1540 is further configured to play the interactive video when receiving a trigger signal that acts on the video message.

The first instruction module 1560 is configured to receive a recording instruction in the process of playing the interactive video.

The video pause module 1570 is configured to pause the interactive video according to the recording instruction.

The first recording module 1580 is configured to record another interactive video according to the recording instruction.

Optionally, the PIP and playing module 1540 is further configured to continue to play or replay the paused interactive video when the recording of the another interactive video is completed.

Figure 16:
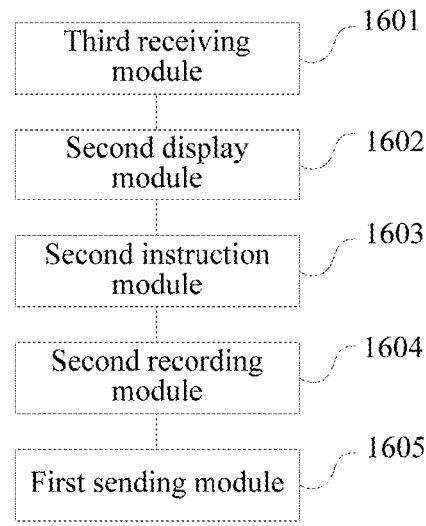
FIG. 16 is a structural block diagram of an interactive apparatus in a live room according to another embodiment of the present disclosure.

Referring to FIG. 16, FIG. 16 shows a structural block diagram of an interactive apparatus in a live room according to still another embodiment of the present disclosure. The interactive apparatus in a live room may implement, by using a dedicated hardware circuit or a combination of software and hardware, all or a part that becomes a second terminal. The interactive apparatus in a live room includes: a third receiving module 1601, a second display module 1602, a second instruction module 1603, a second recording module 1604, and a first sending module 1605.

The third receiving module 1601 is configured to receive, from a live backstage, a live video stream sent by a first client.

The second display module 1602 is configured to display a live interface according to the live video stream.

The second instruction module 1603 is configured to receive a recording instruction in the process of displaying the live interface.

The second recording module 1604 is configured to record an interactive video according to the recording instruction.

Optionally, video duration of the interactive video is less than a preset threshold.

The first sending module 1605 is configured to send the interactive video to the live backstage.

Optionally, the interactive video is a video used that can be played in a PIP mode by the first client and/or a second client on an area of the live interface.

In summary, in the interactive apparatus in a live room provided in this embodiment, in the process of playing the interactive video, the second client records another interactive video, and continues to play or replays the paused interactive video after the recording is completed, so that the process of playing the interactive video does not affect the process of recording another interactive video, thereby implementing compatibility of the playing process and the recording process.

Figure 17:
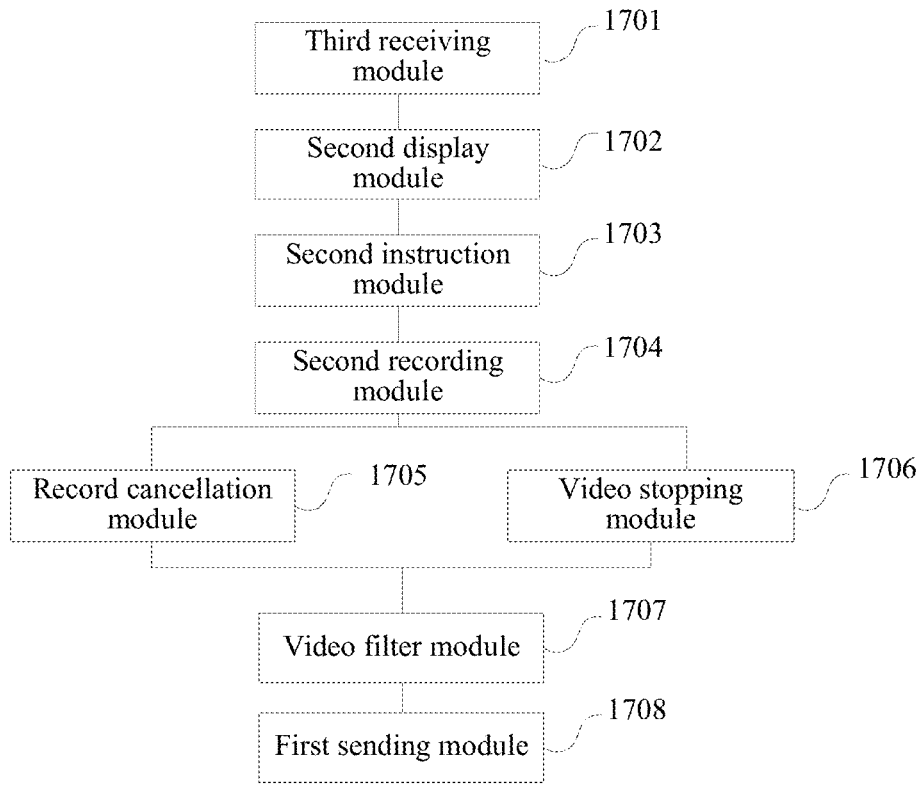
FIG. 17 is a structural block diagram of an interactive apparatus in a live room according to another embodiment of the present disclosure.

Referring to FIG. 17, FIG. 17 shows a structural block diagram of an interactive apparatus in a live room according to an embodiment of the present disclosure. The interactive apparatus in a live room may implement, by using a dedicated hardware circuit or a combination of software and hardware, all or a part that becomes a second terminal. The interactive apparatus in a live room includes: a third receiving module 1701, a second display module 1702, a second instruction module 1703, a second recording module 1704, a record cancellation module 1705, a video stopping module 1706, a video filter module 1707, and a first sending module 1708.

The third receiving module 1701 is configured to receive, from a live backstage, a live video stream sent by a first client.

The second display module 1702 is configured to display a live interface according to the live video stream.

The second instruction module 1703 is configured to receive a recording instruction in the process of displaying the live interface.

The second recording module 1704 is configured to record an interactive video according to the recording instruction.

Optionally, video duration of the interactive video is less than a preset threshold.

Optionally, the second recording module 1704 is further configured to record the interactive video within continuous duration of the recording instruction.

Optionally, the video duration of the interactive video is equal to or less than the continuous duration of the recording instruction.

The record cancellation module 1705 is configured to cancel the recording of the interactive video when the continuous duration of the recording instruction is less than a lowest threshold.

Alternatively, the video stopping module 1706 is configured to stop recording the interactive video when the continuous duration of the recording instruction is greater than the preset threshold.

Optionally, the lowest threshold is less than the preset threshold.

The video filter module 1707 is configured to perform special effect processing on the interactive video according to a preset filter.

Optionally, the preset filter includes at least one of a beautification filter, a stylization filter, a brush stroke filter, and a sketch filter.

The beautification filter is achieving a beautification effect by mean of functions such as whitening, retouching, and refreshing. The stylization filter is generating a painting or impressionistic effect in a selection area by replacing pixels and by searching and increasing the contrast of an image. The brush stroke filter is stroking by simulating different brushes and inks to create a painting effect. The sketch filter is simplifying colors of an image by creating a hand-painted image effect.

The first sending module 1708 is configured to send the interactive video to the live backstage.

Optionally, the interactive video is a video that can be played in PIP mode by the first client and/or a second client to play on an area of the live interface.

Optionally, the first sending module 1708 is further configured to send the interactive video to the live backstage when the continuous duration of the recording instruction ends.

Optionally, the first sending module 1708 is further configured to send the interactive video in a video message form to the live backstage when the continuous duration of the recording instruction ends.

Figure 18:
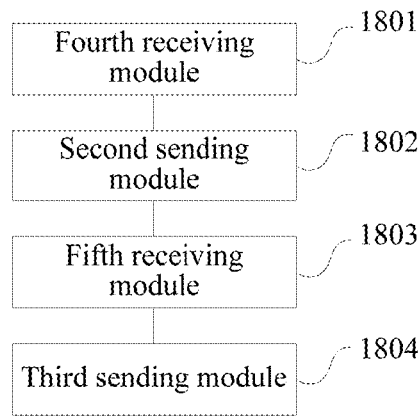
FIG. 18 is a structural block diagram of an interactive apparatus in a live room according to another embodiment of the present disclosure.

Referring to FIG. 18, FIG. 18 shows a structural block diagram of an interactive apparatus in a live room according to another embodiment of the present disclosure. The interactive apparatus in a live room may implement, by using a dedicated hardware circuit or a combination of software and hardware, all or a part that becomes a live backstage. The interactive apparatus in a live room includes a fourth receiving module 1801, a second sending module 1802, a fifth receiving module 1803, and a third sending module 1804.

The fourth receiving module 1801 is configured to receive a live video stream sent by a first client.

The second sending module 1802 is configured to send the live video stream to a client in a live room.

Optionally, the client in the live room includes the first client and/or a second client.

The fifth receiving module 1803 is configured to receive an interactive video sent by the second client.

The third sending module 1804 is configured to send the interactive video to the client in the live room.

Optionally, the fifth receiving module 1803 is further configured to receive the interactive video sent by the second client in a video message form.

Optionally, the third sending module 1804 is further configured to send the video message to the client in the live room, and the client in the live room is configured to download the interactive video according to the video message.

Figure 19:
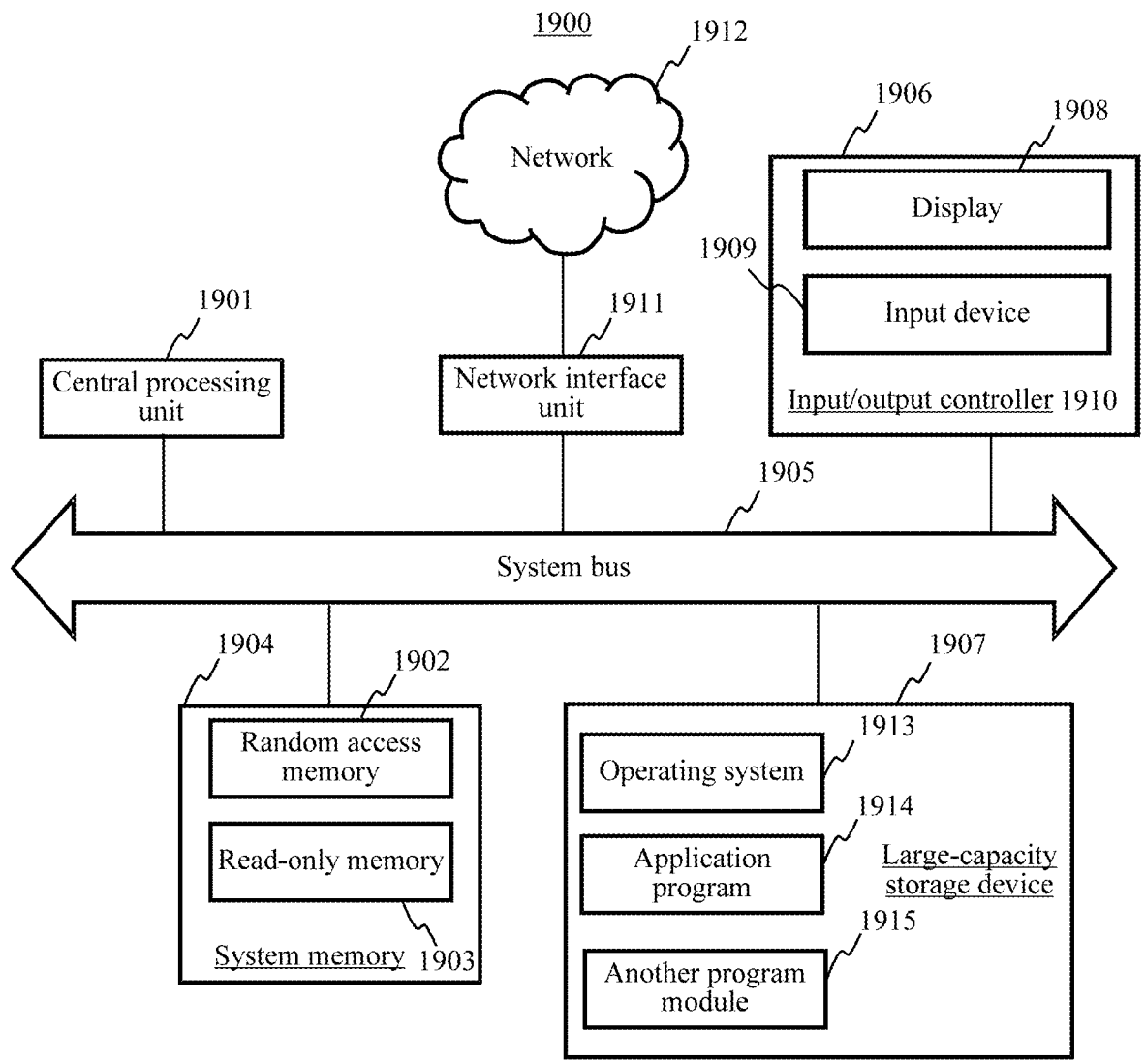
FIG. 19 is schematic structural diagram of a server according to an embodiment of the present disclosure.

FIG. 19 shows a schematic structural diagram of a server according to an embodiment of the present disclosure. The server may be a live server 141 or a video server 142 or a picture server 143 or a message server 144 in a live backstage 140.

Specifically, the server 1900 includes a central processing unit (CPU) 1901, a system memory 1904 including a random access memory (RAM) 1902 and a read-only memory (ROM) 1903, and a system bus 1905 connecting the system memory 1904 and the CPU 1901. The server 1900 further includes a basic input/output system (I/O system) 1906 assisting in transmitting information between devices in a computer, and a large-capacity storage device 1907 configured to store an operating system 1913, an application program 1914 and another program module 1915.

The basic I/O system 1906 includes a display 1908 configured to display information and an input device 1909, such as a mouse or a keyboard, configured to input information for a user. The display 1908 and the input device 1909 are both connected to the CPU 1901 by using an input and output controller 1910 connected to the system bus 1905. The basic input/output system 1906 may further include an input/output controller 1910 configured to receive and process an input of multiple other devices from a keyboard, a mouse, an electronic stylus, or the like. Similarly, the input and output controller 1910 further provides an output to a display screen, a printer or another type of output device.

The large-capacity storage device 1907 is connected to the CPU 1901 by using a large-capacity storage controller (not shown) connected to the system bus 1905. The large-capacity storage device 1907 and its associated computer readable medium provide non-volatile storage for the server 1900. That is to say, the large-capacity storage device 1907 may include the computer readable medium (not shown) such as a hard disk or a CD-ROM driver.

Without loss of generality, the computer readable medium may include a computer storage medium and a communications medium. The computer storage medium includes volatile and non-volatile media, and removable and non-removable media implemented by using any method or technology used for storing information such as a computer readable instruction, a data structure, a program module or other data. The computer storage medium includes a RAM, a ROM, an EPROM, an EEPROM, a flash memory or other solid storage technologies; a CD-ROM, a DVD or other optical storages; and a cassette, a magnetic tape, a disk storage or other magnetic storage devices. In some embodiments, persons skilled in art can know that the computer storage medium is not limited to the foregoing several types. The system memory 1904 and the large-capacity storage device 1907 may be collectively referred to as a memory.

According to various embodiments of the present disclosure, the server 1900 may further be connected, by means of a network such as the Internet, to a remote computer on a network for running. That is, the server 1900 may be connected to a network 1905 by using a network interface unit 1911 connected to the system bus 1912, or may also be to be connected to another type of network or remote computer system (not shown) by using the network interface unit 1911.

The memory further includes one or more programs, the one or more programs are stored in the memory and are configured by the CPU to implement the steps completed by the live backstage in the interactive method in a live room shown in any one of FIG. 2, FIG. 4, FIG. 6, FIG. 8 and FIG. 10.

Figure 20:
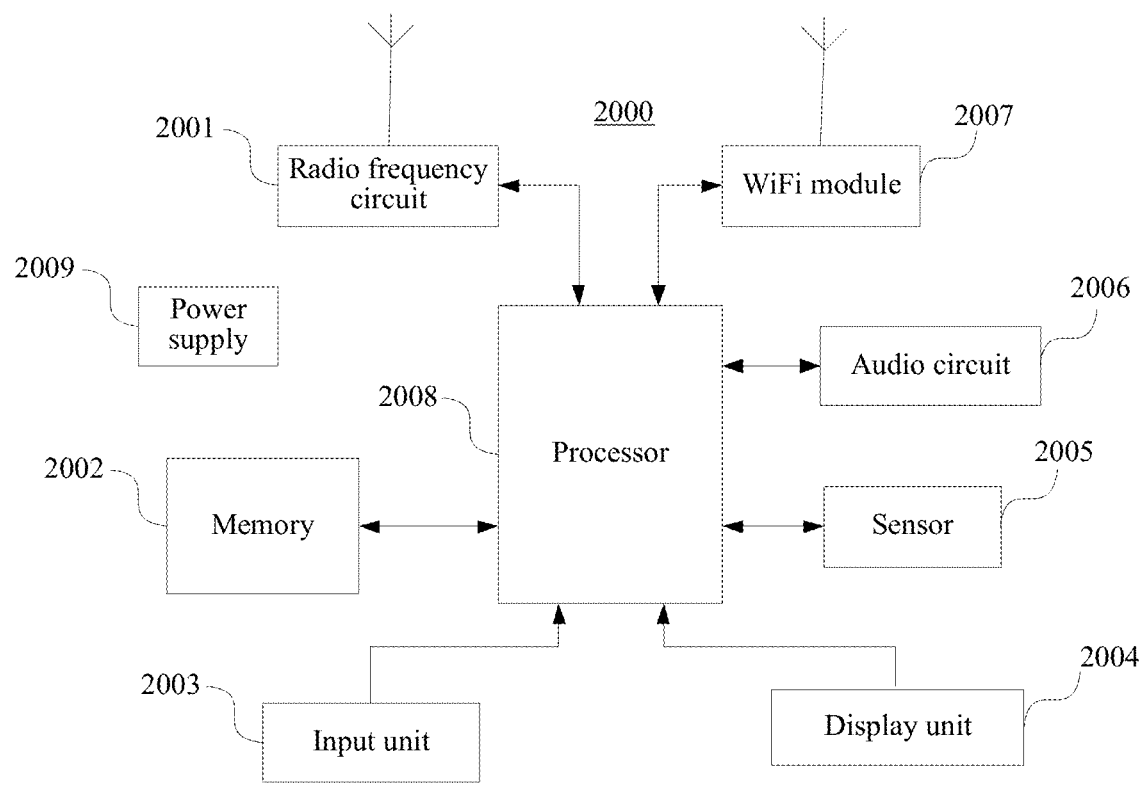
FIG. 20 is a block diagram of a terminal according to an embodiment of the present disclosure.

FIG. 20 shows a block diagram of a terminal 2000 according to an embodiment of the present disclosure. The terminal may be a first terminal or a second terminal shown in FIG. 1A or FIG. B. The terminal may include components such as a radio frequency (RF) circuit 2001, a memory 2002 including one or more computer readable storage media, an input unit 2003, a display unit 2004, a sensor 2005, an audio circuit 2006, a wireless fidelity (WiFi) module 2007, a processor 2008 including one or more processing cores, and a power supply 2009. A person skilled in the technology may understand that the structure of the terminal shown in FIG. 20 does not constitute a limitation to the terminal, and the terminal may include more components or fewer components than those shown in the figure, or some components may be combined, or a different component deployment may be used.

The RF circuit 2001 may be configured to receive and send signals during information receiving and sending or during a call. Particularly, the RF circuit 110 receives downlink information from a base station, then delivers the downlink information to one or more processors 2008 for processing, and sends related uplink data to the base station. Generally, the RF circuit 2001 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 801 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), an email, a short messaging service (SMS), and the like.

A module as described in the present disclosure may refer to one more software programs. The memory 2002 may be configured to store a software program and the corresponding module. The processor 2008 runs the software program and module stored in the memory 2002, to implement various functional applications and data processing of the module. The memory 2002 may mainly include a program storage area and a data storage area. The program storage area may store an operating system, an application program required by at least one function (such as a sound playback function and an image display function), and the like. The data storage area may store data (such as audio data and an address book) created according to use of the terminal, and the like. In addition, the memory 2002 may include a high speed random access memory, and may further include a non-volatile memory, such as at least one magnetic disk storage device, a flash memory, or other volatile solid-state storage devices. Correspondingly, the memory 2002 may further include a memory controller, to provide access of the processor 2008 and the input unit 2003 to the memory 2002.

In some embodiments, a functional module may include software and hardware components. The memory 2002 may be configured to store one or more software programs. The processor 2008 runs the software programs stored in the memory 2002. Together with the corresponding hardware components, the processor implements various functional applications and data processing of the module.

The input unit 2003 may be configured to receive input digit or character information, and generate a keyboard, mouse, joystick, optical or track ball signal input related to the user setting and function control. Specifically, in a specific embodiment, the input unit 2003 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. Optionally, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 2008. Moreover, the touch controller can receive and execute a command sent by the processor 2008. In addition, the touch-sensitive surface may be implemented in multiple types, such as a resistive type, a capacitive type, an infrared type, and a surface acoustic wave type. In addition to the touch-sensitive surface, the input unit 2003 may further include another input device. Specifically, the another input device may include but is not limited to one or more of a physical keyboard, a function key (for example, a volume control key or a power on/off key), a trackball, a mouse, or a joystick.

In this embodiment, the display unit 2004 may be configured to display information input by the user or information provided for the user, and various graphical user interfaces of the terminal. The graphical user interfaces may be composed of graphics, text, icons, videos, and any combination thereof. The display unit 2004 may include a display panel. Optionally, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfer the touch operation to the processor 808 to determine a type of a touch event, and then the processor 2008 provides corresponding visual output on the display panel according to the type of the touch event. In some embodiments, the touch-sensitive surface may be integrated with the display panel to implement an input and output function.

The terminal may further include at least one sensor 2005 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel and/or backlight when the terminal is moved to the ear. As one type of motion sensor, a gravity acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the terminal, are not described in detail herein.

The audio circuit 2006, a speaker, and a microphone may provide audio interfaces between the user and the terminal. The audio circuit 2006 may convert received audio data into an electric signal and transmit the electric signal to the speaker 2006. The speaker converts the electric signal into a sound signal for output. On the other hand, the microphone converts a collected sound signal into an electric signal. The audio circuit 2006 receives the electric signal and converts the electric signal into audio data, and outputs the audio data to the processor 2008 for processing. Then, the processor 2008 sends the audio data to, for example, another terminal by using the RF circuit 801, or outputs the audio data to the memory 2002 for further processing. The audio circuit 2006 may further include an earplug jack, to provide communication between a peripheral earphone and the terminal.

WiFi is a short distance wireless transmission technology. The terminal may help, by using the WiFi module 2007, the user to receive and send e-mails, browse a web page, access streaming media, and so on, which provides wireless broadband Internet access for the user.

The processor 2008 is the control center of the terminal, and is connected to various parts of the mobile phone by using various interfaces and lines. By running or executing the software program and/or module stored in the memory 2002, and invoking data stored in the memory 2002, the processor 880 performs various functions and data processing of the terminal, thereby performing overall monitoring on the mobile phone. Optionally, the processor 2008 may include one or more processor cores. Preferably, the processor 2008 may integrate an application processor and a modem processor. The application processor mainly processes an operating system, a user interface, an application program, and the like. The modem processor mainly processes wireless communication. It may be understood that the foregoing modem processor may alternatively not be integrated into the processor 2008.

The terminal further includes the power supply 2008 (such as a battery) for supplying power to the components. Preferably, the power supply may be logically connected to the processor 2008 by using a power management system, thereby implementing functions such as charging, discharging and power consumption management by using the power management system. The power supply 2008 may further include one or more of a direct current or alternating current power supply, a re-charging system, a power failure detection circuit, a power supply converter or inverter, a power supply state indicator, and any other components.

Although not shown in the figure, the terminal may further include a camera, a Bluetooth module, and the like, which are not described herein. Specifically, in this embodiment, the processor 2008 in the terminal runs one or more program instructions stored in the memory 2002, thereby implementing the steps performed by the first client or the second client in the interactive method in a live room provided in the method embodiments shown in FIG. 2, FIG. 4, FIG. 6, FIG. 8 and FIG. 10.

A person of ordinary skill in the technology may understand that all or some of the steps of the methods in the foregoing embodiments may be implemented by a program instructing relevant hardware. The program may be stored in a computer readable storage medium. The storage medium may include: a ROM, a RAM, a magnetic disk, an optical disc, or the like.

The embodiments of this application further provide a computer readable storage medium, the computer readable storage medium stores at least one instruction, and the instruction is loaded and executed by the processor to implement the interactive method in a live room at the first client or second client side of the foregoing embodiments.

After considering the specification and practicing the present disclosure, a person skilled in the technology would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as merely exemplary, and the real scope and spirit of the present disclosure are pointed out in the following claims.

It should be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. An interactive method in a live room, comprising:
receiving, from a live backstage, a live video stream sent by a first client;
displaying a live interface on a display screen according to the live video stream;
displaying, in a comment area on the live interface, a message indicating that a second client sends an interactive video, the second client and the first client belonging to a same live room, the interactive video being a video whose video duration is less than a length threshold, and the message including an identifier corresponding to the second client and an image encapsulated into a triggerable control;

receiving, from the live backstage, the interactive video; and upon receiving a trigger signal that acts on the message, playing, in picture-in-picture mode (PIP), the interactive video on a PIP area of the live interface.

2. The method according to claim 1, further comprising:
storing the interactive video in a play queue according to a sequence of a receiving time of the interactive video;
reading, from the play queue, the interactive video sorted at the head of the queue; and
playing in PIP mode the interactive video sorted at the head of the queue on the PIP area of the live interface.

3. The method according to claim 1, further comprising:
receiving, from the live backstage, a video message corresponding to the interactive video; and
downloading, from the live backstage according to the video message, the interactive video sent by the second client.

4. The method according to claim 1, further comprising:
receiving a recording instruction in a process of playing the interactive video;
pausing the interactive video according to the recording instruction;
recording a second interactive video according to the recording instruction; and
continuing to play or replaying the paused interactive video when the recording of the second interactive video is completed.

5. The method according to claim 1, further comprising:
receiving, from a message server, a video message corresponding to the interactive video;
downloading the image from a picture server according to the video message; and
downloading the interactive video from a video server according to a video message identifier carried in the video message.

6. The method according to claim 1, wherein the image is downloaded from the picture server according to a URL carried in the video message or the video message identifier carried in the video message.

7. An interactive method in a live room, comprising:
receiving, from a live backstage, a live video stream sent by a first client;
displaying a live interface according to the live video stream;
receiving a recording instruction in a process of displaying the live interface;
recording an interactive video according to the recording instruction, video duration of the interactive video being less than a length threshold;
sending the interactive video to the live backstage, the interactive video being a video that can be played in PIP mode by the first client or a second client on a PIP area of the live interface;
displaying, in a comment area on the live interface, a message indicating the interactive video is published, the message including an identifier of a publisher and an image encapsulated into a triggerable control, wherein the interactive video is played in the PIP mode upon receiving a trigger signal that acts on the message.

8. The method according to claim 7, further comprising:
recording the interactive video within a continuous duration of the recording instruction, the video duration of the interactive video being equal to or less than the continuous duration of the recording instruction.

9. The method according to claim 8, wherein the method further comprises:
cancelling the recording of the interactive video when the continuous duration of the recording instruction is shorter than a low threshold; or
stopping the recording of the interactive video when the continuous duration of the recording instruction is longer than the length threshold, the low threshold being less than the length threshold.

10. The method according to claim 8, wherein the sending the interactive video to the live backstage comprises:
sending the interactive video to the live backstage when the continuous duration of the recording instruction ends.

11. The method according to claim 7, wherein the sending the interactive video to the live backstage when the continuous duration of the recording instruction ends comprises:
sending the interactive video in a video message form to the live backstage when the continuous duration of the recording instruction ends.

12. The method according to claim 7, further comprising:
performing special effect processing on the interactive video according to a preset filter, the preset filter comprising at least one of a beautification filter, a stylization filter, a brush stroke filter, and a sketch filter.

13. The method according to claim 7, further comprising:
stopping playing sound of the live video stream in a process of recording the interactive video, until the recording of the interactive video ends.

14. An interactive method in a live room, comprising:
receiving a live video stream sent by a first client;
sending the live video stream to a client in a live room to be played on a live interface, the client in the live room comprising the first client or a second client;
receiving an interactive video sent by the second client;
sending a message to the client in the live room, the message being displayed in a comment area on the live interface and indicating that the second client publishes the interactive video, the message including an identifier corresponding to the second client and an image encapsulated into a triggerable control; and
sending the interactive video to the client in the live room, the interactive video being a video that can be played on a PIP area of the live interface upon receiving a trigger signal that acts on the message.

15. The method according to claim 14, wherein the receiving an interactive video sent by the second client comprises:
receiving the interactive video sent in a video message form by the second client.

16. The method according to claim 14, further comprising:
sending, by a message server, a video message to the client;
sending, by a picture server, a cover of the interactive video, the cover being used as the image encapsulated into the triggerable control; and
sending, by a video server, the interactive video to the client.

17. A server, comprising a processor and a memory; wherein the memory is configured to store one or more program instructions; and the processor is configured to run the program instructions stored in the memory, to perform:

receiving a live video stream sent by a first client;

sending the live video stream to a client in a live room to be played on a live interface, the client in the live room comprising the first client or a second client;

receiving an interactive video sent by the second client;

sending a message to the client in the live room, the message being displayed in a comment area on the live interface and indicating that the second client publishes the interactive video, the message including an identifier corresponding to the second client and an image encapsulated into a triggerable control; and sending the interactive video to the client in the live room, the interactive video being a video that can be played in a PIP area of the live interface upon receiving a trigger signal that acts on the message.

18. The server according to claim 17, wherein the processor is further configured to run the program instructions stored in the memory, to perform:

receiving the interactive video sent in a video message form by the second client.

19. The server according to claim 17, wherein the processor is further configured to run the program instructions stored in the memory, to perform:

receiving a cover for the interactive video, the cover being used as the image included in the message.

20. The server according to claim 17, wherein the processor is further configured to run the program instructions stored in the memory, to:

perform special effect processing on the interactive video according to a preset filter, the preset filter comprising at least one of a beautification filter, a stylization filter, a brush stroke filter, and a sketch filter.

* * * * *